(12) United States Patent
Sumiyoshi

(10) Patent No.: US 9,787,960 B2
(45) Date of Patent: Oct. 10, 2017

(54) IMAGE PROCESSING APPARATUS, IMAGE PROCESSING SYSTEM, IMAGE PROCESSING METHOD, AND COMPUTER PROGRAM

(71) Applicant: Shinichi Sumiyoshi, Kanagawa (JP)

(72) Inventor: Shinichi Sumiyoshi, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 14/910,168

(22) PCT Filed: Aug. 12, 2014

(86) PCT No.: PCT/JP2014/071514
§ 371 (c)(1),
(2) Date: Feb. 4, 2016

(87) PCT Pub. No.: WO2015/022999
PCT Pub. Date: Feb. 19, 2015

(65) Prior Publication Data
US 2016/0182873 A1    Jun. 23, 2016

(30) Foreign Application Priority Data

Aug. 13, 2013  (JP) ................................ 2013-168309
Jun. 9, 2014   (JP) ................................ 2014-118626

(51) Int. Cl.
*H04N 3/223*  (2006.01)
*H04N 9/31*   (2006.01)
*G06K 9/46*   (2006.01)

(52) U.S. Cl.
CPC ......... *H04N 9/3185* (2013.01); *G06K 9/4604* (2013.01); *H04N 9/3194* (2013.01)

(58) Field of Classification Search
USPC ................... 345/156, 207; 348/46; 396/430; 358/3.29; 702/56; 356/124; 430/25;
(Continued)

(56) References Cited

U.S. PATENT DOCUMENTS

2005/0105057 A1* 5/2005 Matsuda .............. H04N 9/3194
                                                          353/70
2005/0168705 A1  8/2005 Li et al.
(Continued)

FOREIGN PATENT DOCUMENTS

JP  2001-83949 A   3/2001
JP  2005-326247 A  11/2005
(Continued)

OTHER PUBLICATIONS

International Search Report dated Nov. 18, 2014 in PCT/JP2014/071514 filed Aug. 12, 2014.
(Continued)

*Primary Examiner* — Brian Yenke
*Assistant Examiner* — Samira Monshi
(74) *Attorney, Agent, or Firm* — Oblon, McClelland, Maier & Neustadt, L.L.P.

(57) ABSTRACT

A projection control unit performs control such that a first pattern image in which first feature points are arranged is caused to be projected on a projection surface, and a second pattern image including second feature points corresponding to the first feature points is caused to be projected on a planar projection surface. An acquisition unit acquires, from a photographing unit, a first photographed image of the projected first pattern image and a second photographed image of the second pattern image. An extraction unit extracts second connected components in which the second feature points are connected in a predetermined direction and first connected components in which the first feature points are (Continued)

connected. A shift amount calculation unit calculates shift amounts of the first connected components with respect to the second connected components. A first calculation unit calculates correction information for correcting a projection target image based on the shift amounts.

8 Claims, 31 Drawing Sheets

(58) Field of Classification Search
USPC .......................................................... 716/51
See application file for complete search history.

(56) References Cited

U.S. PATENT DOCUMENTS

| | | |
|---|---|---|
| 2008/0062164 A1 | 3/2008 | Bassi et al. |
| 2009/0207185 A1 | 8/2009 | Furui et al. |
| 2009/0245682 A1 | 10/2009 | Imai |
| 2011/0176007 A1 | 7/2011 | Ding et al. |
| 2013/0141593 A1 | 6/2013 | Bassi et al. |
| 2014/0168525 A1 | 6/2014 | Hasegawa et al. |
| 2014/0204204 A1 | 7/2014 | Sumiyoshi et al. |

FOREIGN PATENT DOCUMENTS

| | | |
|---|---|---|
| JP | 2007-036482 | 2/2007 |
| JP | 2008-287426 A | 11/2008 |
| JP | 2009-239638 | 10/2009 |
| JP | 2010-044255 | 2/2010 |
| JP | 2011-147125 | 7/2011 |
| JP | 2013-041166 | 2/2013 |
| JP | 2013-042411 | 2/2013 |
| KR | 10-2005-0030872 A | 3/2005 |
| WO | WO 2013/024882 A1 | 2/2013 |

OTHER PUBLICATIONS

Extended European Search Report dated Jul. 7, 2016 in Patent Application No. 14835859.1.
Korean Office Action dated Dec. 21, 2016 in patent application No. 10-2016-7002924 with English translation.
Notice of Allowance of Patent dated May 23, 2017 in Korean Patent Application No. 10-2016-7002924 (with English translation).

* cited by examiner (U,V) COORDINATE SYSTEM

| TARGET ELEMENT | LEFT ADJACENT FEATURE POINT NUMBER | UPPER ADJACENT FEATURE POINT NUMBER |
|---|---|---|
| 1 | 0 | 0 |
| 2 | 1 | 0 |
| 3 | 2 | 0 |
| ⋮ | ⋮ | ⋮ |
| C | Cm | Cn |

FIG.25
(A)
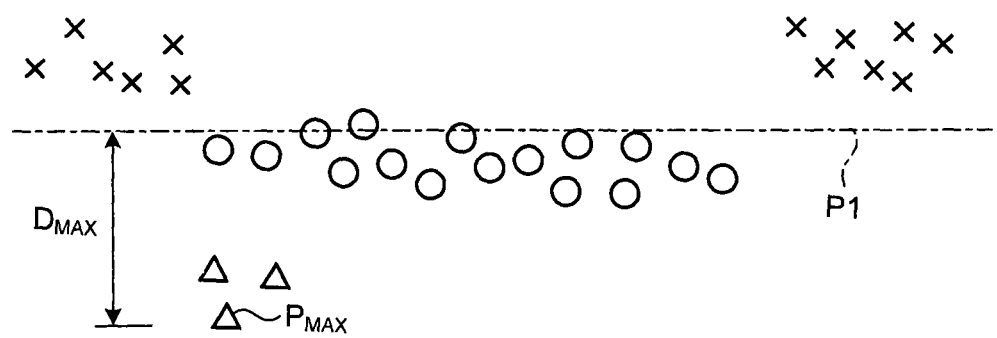
(B)
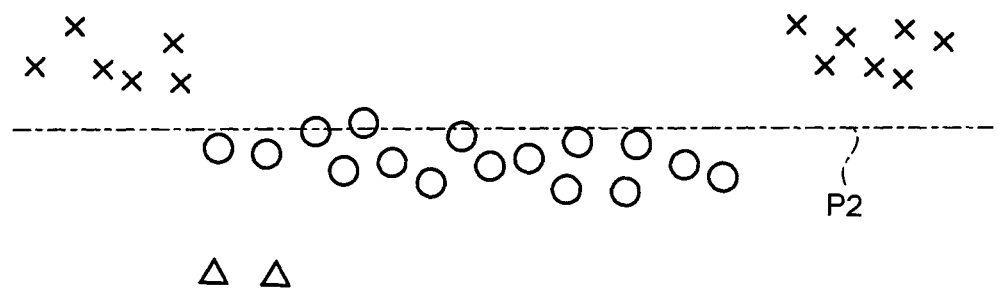

FIG.27
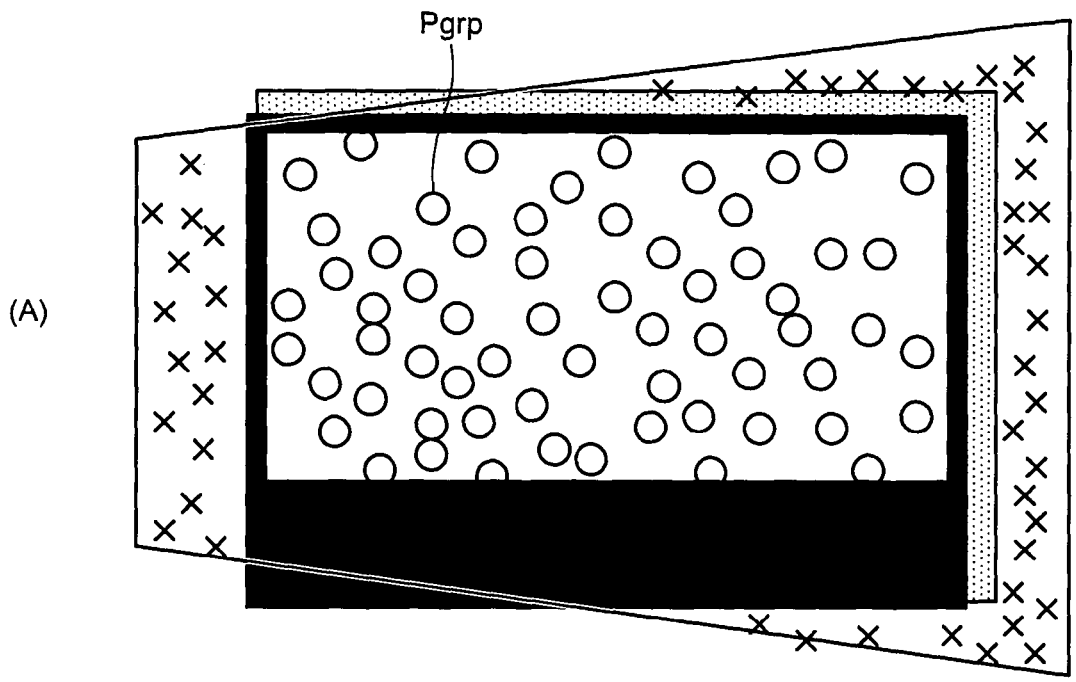
(A)
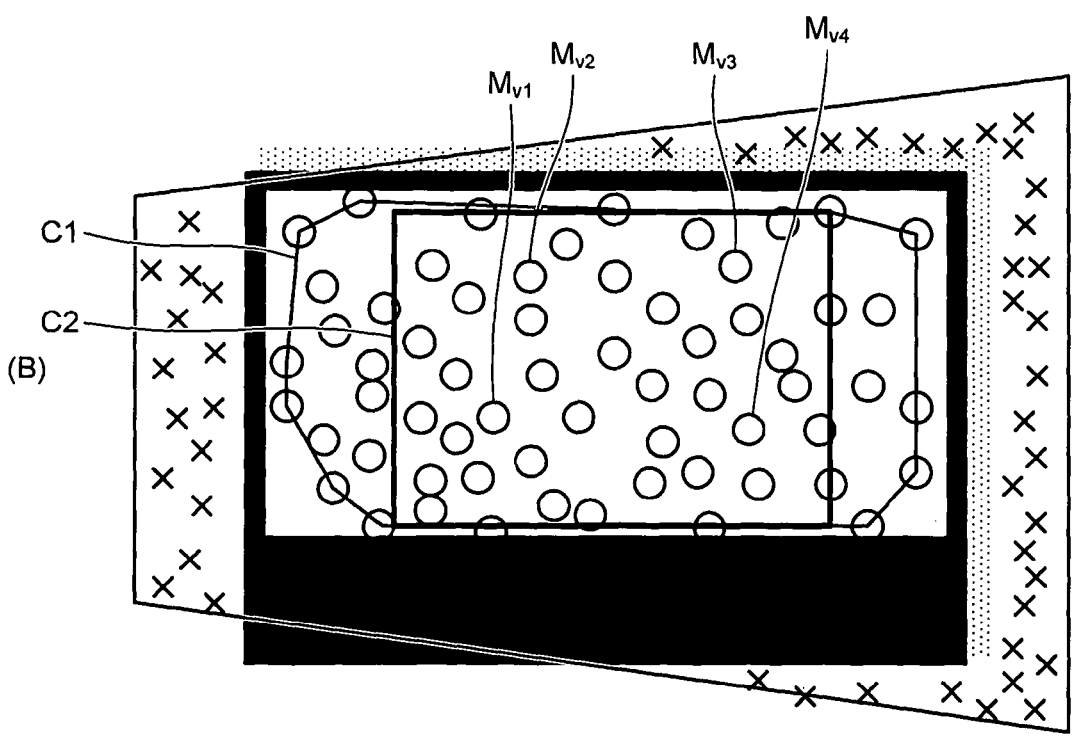
(B)

FIG.28
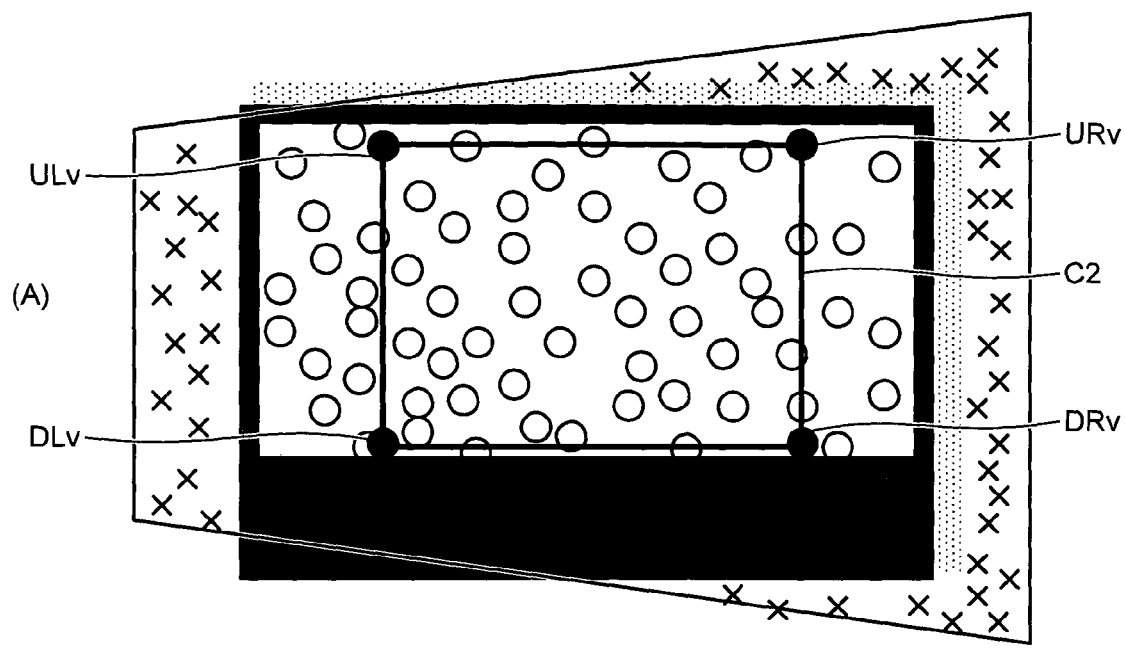
(A)
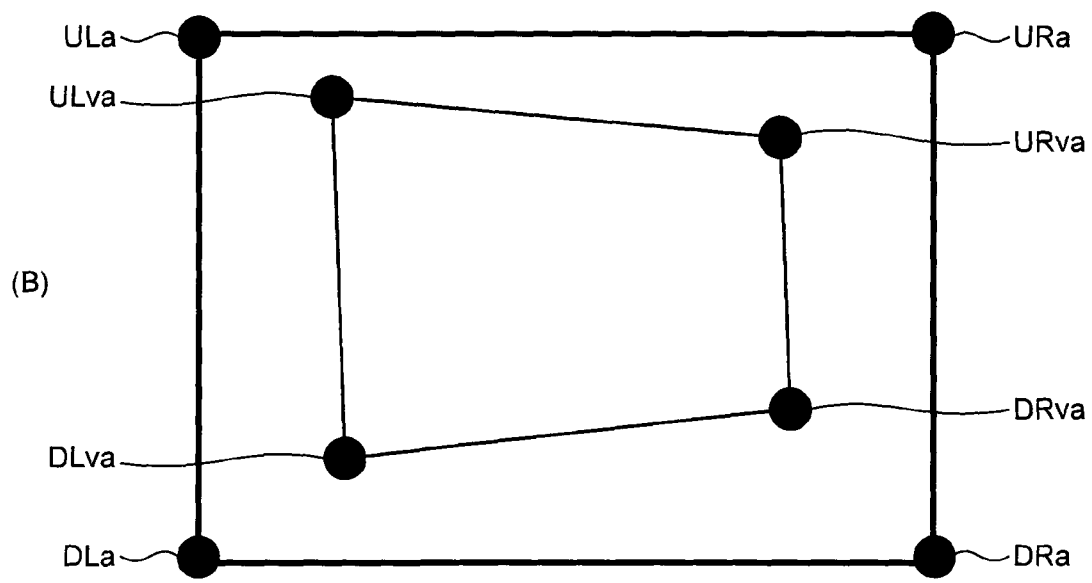
(B)

IMAGE PROCESSING APPARATUS, IMAGE PROCESSING SYSTEM, IMAGE PROCESSING METHOD, AND COMPUTER PROGRAM

TECHNICAL FIELD

The present invention relates to an image processing apparatus, an image processing system, an image processing method, and a computer program.

BACKGROUND ART

There has been known a technique of correcting image distortions using detection results of projection surfaces on which images are projected. As an example of the techniques of detecting the projection surface, there has been disclosed a technique of detecting a screen frame indicating a frame of a projection surface from a photographed image of a projection image projected on the projection surface (refer to Japanese Patent Application Laid-open No. 2010-044255).

Japanese Patent Application Laid-open No. 2010-044255 discloses that three-dimensional coordinates of a plurality of measurement points formed by a measurement pattern on a projection area are measured, a stepped area including a step on the projection area is detected from the photographed image using the three-dimensional coordinates of the measurement points, and the screen frame is detected from the stepped area. In Japanese Patent Application Laid-open No. 2010-044255, a distortion of image data serving as a projection target is corrected on the basis of the shape of the screen frame.

It is, however, conventionally difficult to correct the distortion of the projection image with high accuracy, because the projection surface is not detected with high accuracy due to the influences of environmental conditions in some cases.

SUMMARY OF THE INVENTION

In view of such a problem, an object of the present invention is to provide an image processing apparatus, an image processing system, an image processing method, and a computer program that can provide correction information capable of correcting the distortion of the projection image with high accuracy.

An image processing apparatus includes a projection control unit, an acquisition unit, an extraction unit, a shift amount calculation unit, a first calculation unit. The projection control unit performs control such that a first pattern image in which a plurality of first feature points are arranged is caused to be projected on a projection surface, and a second pattern image including a plurality of second feature points corresponding to the first feature points is caused to be projected on a planar projection surface. The acquisition unit acquires, from a photographing unit, a first photographed image of the projected first pattern image projected on the projection surface and a second photographed image of the second pattern image projected on the planar projection surface. The extraction unit extracts second connected components in which the second feature points in the second photographed image are connected in a predetermined direction and first connected components in which the first feature points in the first photographed image at positions corresponding to the second feature points included in the second connected components are connected. The shift amount calculation unit calculates shift amounts of the first connected components with respect to the second connected components. The first calculation unit calculates first correction information for correcting a projection target image on the basis of the shift amounts.

BRIEF DESCRIPTION OF DRAWINGS

FIG. 25 is an explanatory view of a calculation method of regression plane data.

FIG. 27 is an explanatory view of inclusion area calculation.

FIG. 28 is an explanatory view of a relation between the front image and a projection target image.

DESCRIPTION OF EMBODIMENT

Figure 1:
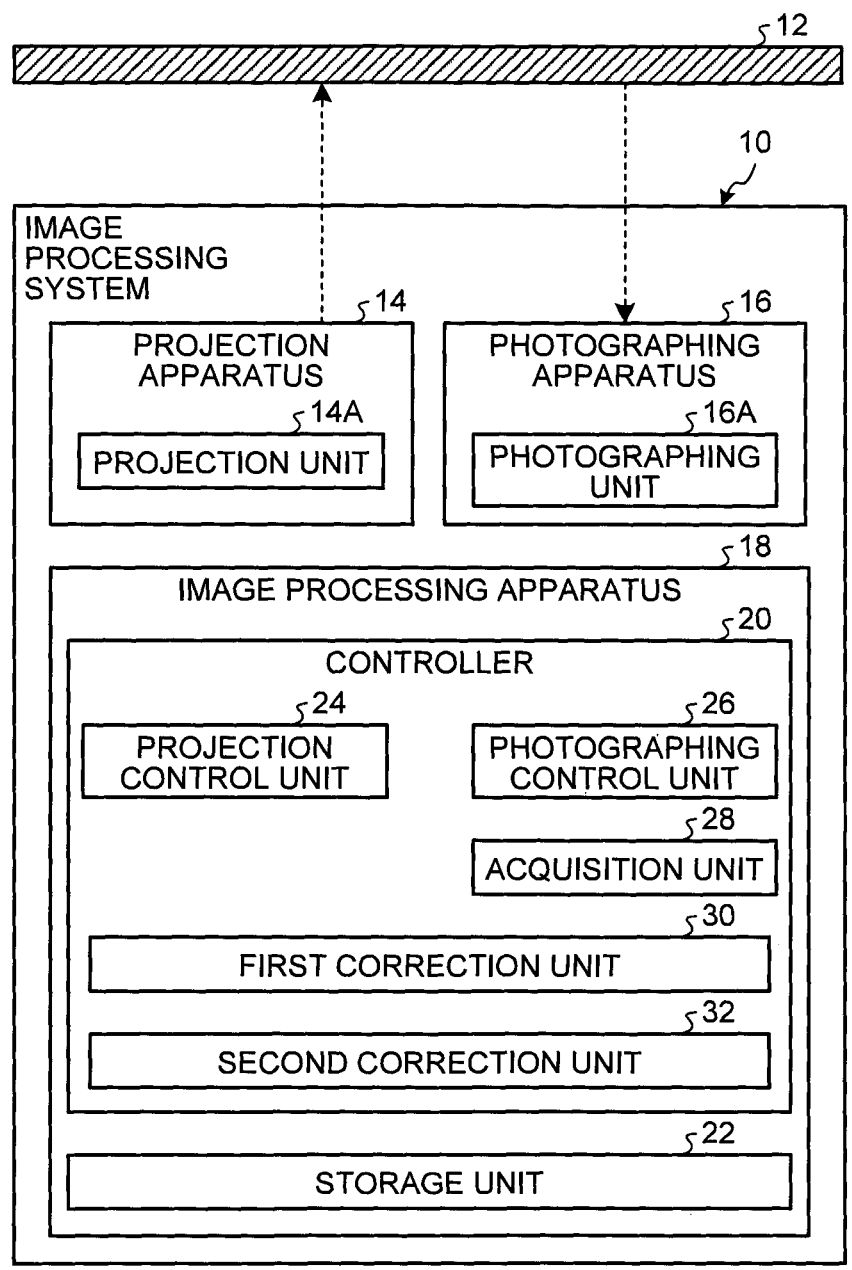
FIG. 1 is a schematic diagram illustrating an image processing system according to an embodiment.

FIG. 1 is a schematic diagram illustrating an image processing system 10 according to an embodiment.

The image processing system 10 includes a projection apparatus 14, a photographing apparatus 16, and an image processing apparatus 18. The projection apparatus 14, the photographing apparatus 16, and the image processing apparatus 18 are coupled through a communication line such as a network.

The network may be a wired communication network or a wireless communication network. For example, a LAN (local area network) is used as the network and a communication protocol such as Ethernet (registered trademark) or a TCP/IP is used.

The projection apparatus 14 is an apparatus that projects a projection target image serving as a projection target on a projection surface 12. Examples of the projection surface 12 include a screen, a wall, and a whiteboard, but are not limited to these. The projection apparatus 14 includes a projection unit 14A. The projection unit 14A projects the projection target image on the projection surface 12. In the embodiment, the projection unit 14A is controlled by the image processing apparatus 18.

The photographing apparatus 16 photographs a projection image projected on the projection surface 12. The photographing apparatus 16 includes a photographing unit 16A. The photographing apparatus 16 photographs the projection image projected on the projection surface 12 to acquire the photographed image. In the embodiment, the photographing unit 16A is controlled by the image processing apparatus 18.

The image processing apparatus 18 controls the projection apparatus 14 and the photographing apparatus 16. The image processing apparatus 18 includes a controller 20 and a storage unit 22.

The storage unit 22 stores therein the projection target images serving as the projection targets and various types of data such as a first pattern image and a second pattern image that are used for correcting the projection target image. The storage unit 22 further stores therein various types of information produced under the control of the controller 20.

The first pattern image is an image in which a plurality of first feature points is arranged. In the embodiment, in the first pattern image, the plurality of first feature points is arranged in a grid, for example. The arrangement of the first feature points is not limited to the grid. The second pattern image is an image that includes a plurality of second feature points corresponding to the first feature points. For example, the second pattern image is a part of the first pattern image. The second pattern image is not limited to being a part of the first pattern image. It is only necessary that the second pattern image includes the plurality of second feature points.

In the embodiment, the first and the second feature points are simply described as the "feature points" when the first and the second feature points are collectively described. The feature points are the areas that can be extracted by the image processing apparatus 18, and are used for calculating correction information for the projection target image serving as the projection target.

Figure 2:
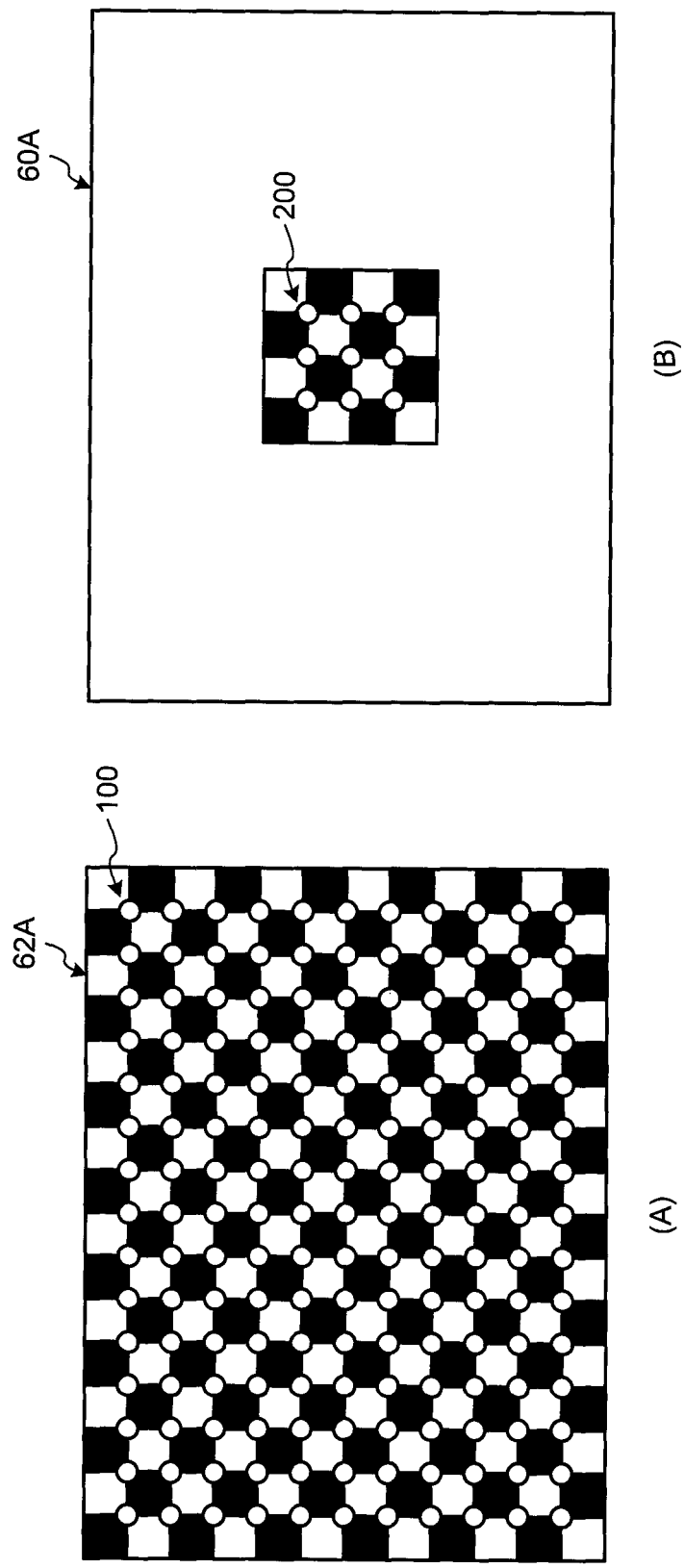
FIG. 2 is a schematic diagram illustrating an example of a first pattern image and a second pattern image.

FIG. 2 is a schematic diagram illustrating an example of a first pattern image 62A and a second pattern image 60A. Part (A) in FIG. 2 is a schematic diagram illustrating an example of the first pattern image 62A. In the embodiment, the first pattern image 62A is an image in which white square areas and black square areas are alternately arranged in a grid. In the embodiment, first feature points 100 in the first pattern image 62A are the points at which vertexes of the white square areas and the vertexes of the black square areas meet.

Part (B) in FIG. 2 is a schematic diagram illustrating an example of the second pattern image 60A. In the embodiment, the second pattern image 60A is an image that includes an area corresponding to the center of the first pattern image 62A and a plurality of second feature points 200. As a result, when the second pattern image 60A and the first pattern image 62A are overlapped, the positions of the respective second feature points 200 in the second pattern image 60A coincide with the positions of the respective first feature points 100 in the first pattern image 62A.

The second feature points 200 in the second pattern image 60A are the points at which vertexes of the white square areas and the vertexes of the black square areas meet in the same manner as the first feature points 100. In the embodiment, the second pattern image 60A is extracted from the central area of the first pattern image 62A such that the plurality of first feature points 100 is included.

In the embodiment, the second pattern image 60A includes nine second feature points 200, which are three second feature points 200 adjacent to one another in a certain direction, and for each of the three second feature points 200, three second feature points 200 adjacent to one another in a direction perpendicular to the certain direction.

In the embodiment, the second pattern image 60A is the image that corresponds to the central area of the first pattern image 62A and includes the plurality of second feature points 200. The second pattern image 60A is not limited to the image corresponding to the central area. It is only necessary that the second pattern image 60A is a part of the first pattern image 62A and includes the plurality of second feature points 200.

From a point of view of calculating first correction information with high accuracy, which is described later, the second pattern image 60A is preferably the image corresponding to the central area of the first pattern image 62A. This is because the area near the center of the projection image, which is the image of the projection target image having been projected, is most likely located on the projection surface 12.

In the embodiment, the second pattern image 60A includes the nine second feature points 200. The second pattern image 60A, however, may be an image that includes at least two or more of the second feature points 200, preferably, four or more of the second feature points 200, and more preferably, eight or more of the second feature points 200. The larger the number of second feature points 200 is included in the second pattern image 60A, the more accurately the first correction information is calculated.

Referring back to FIG. 1, the controller 20 controls the image processing apparatus 18. The controller 20 is a computer that includes a CPU (central processing unit), a ROM (read only memory), a RAM (random access memory), and the like.

The controller 20 includes a projection control unit 24, a photographing control unit 26, an acquisition unit 28, a first correction unit 30, and a second correction unit 32. The projection control unit 24, the photographing control unit 26, the acquisition unit 28, the first correction unit 30, and the second correction unit 32 may be implemented by a computer program, i.e., by software, executed by a processing unit, such as the CPU, or by hardware such as an integrated circuit (IC), or by using both software and hardware, for example.

The projection control unit 24 controls the projection unit 14A. In the embodiment, the projection control unit 24 controls the projection unit 14A such that the projection unit 14A projects the first pattern image 62A and the second pattern image 60A, which are the projection target images, on the projection surface 12. The projection control unit 24 controls the projection unit 14A such that the projection unit 14A projects various projection target images serving as the projection targets on the projection surface 12.

In the embodiment, the projection surface 12 needs to be a planar projection surface when the second pattern image 60A is projected on the projection surface 12. The planar projection surface 12 used when the second pattern image 60A is projected means a projection surface having a degree of planarity that does not cause a distortion in the projection image. The distortion means distortion of the projection image projected on the projection surface 12 with respect to the projection target image (the image before being projected) serving as the projection target. No distortion occurs in a second projection image, which is the image of the second pattern image 60A projected on the projection surface 12. In other words, no discrepancies occur between the positions of the respective second feature points 200 in the second projection image and the positions of the corresponding second feature points 200 in the second pattern image 60A, which is the image before being projected.

In contrast, in the embodiment, when the first pattern image 62A is projected on the projection surface 12, the projection surface 12 needs to be under an actual projection condition, which is one of the actual projection conditions under which various projection target images are projected. As a result, a distortion caused by the projection surface 12 used when the first pattern image 62A is projected may occur in a first projection image, which is the image of the first pattern image 62A projected on the projection surface 12, and any discrepancies may occur between the positions of the respective first feature points 100 in the first projection image and the positions of the corresponding first feature points 100 in the first pattern image 62A, which is the image before being projected.

The photographing control unit 26 controls the photographing unit 16A. In the embodiment, the photographing control unit 26 controls the photographing unit 16A such that the photographing unit 16A photographs the projection image projected on the projection surface 12. The acquisition unit 28 acquires the photographed image obtained by photographing by the photographing unit 16A. In the embodiment, the acquisition unit 28 acquires a first photographed image obtained by photographing the first pattern image 62A projected on the projection surface 12 (i.e., the first projection image) and a second photographed image obtained by photographing the second pattern image 60A projected on the projection surface 12 (i.e., the second projection image).

It is preferable that a first relative position indicating a relative position between the projection surface 12 and the projection apparatus 14 when the first pattern image 62A is photographed be coincident with a second relative position indicating a relative position between the projection surface 12 and the projection apparatus 14 when the second pattern image 60A is photographed.

Figure 3:
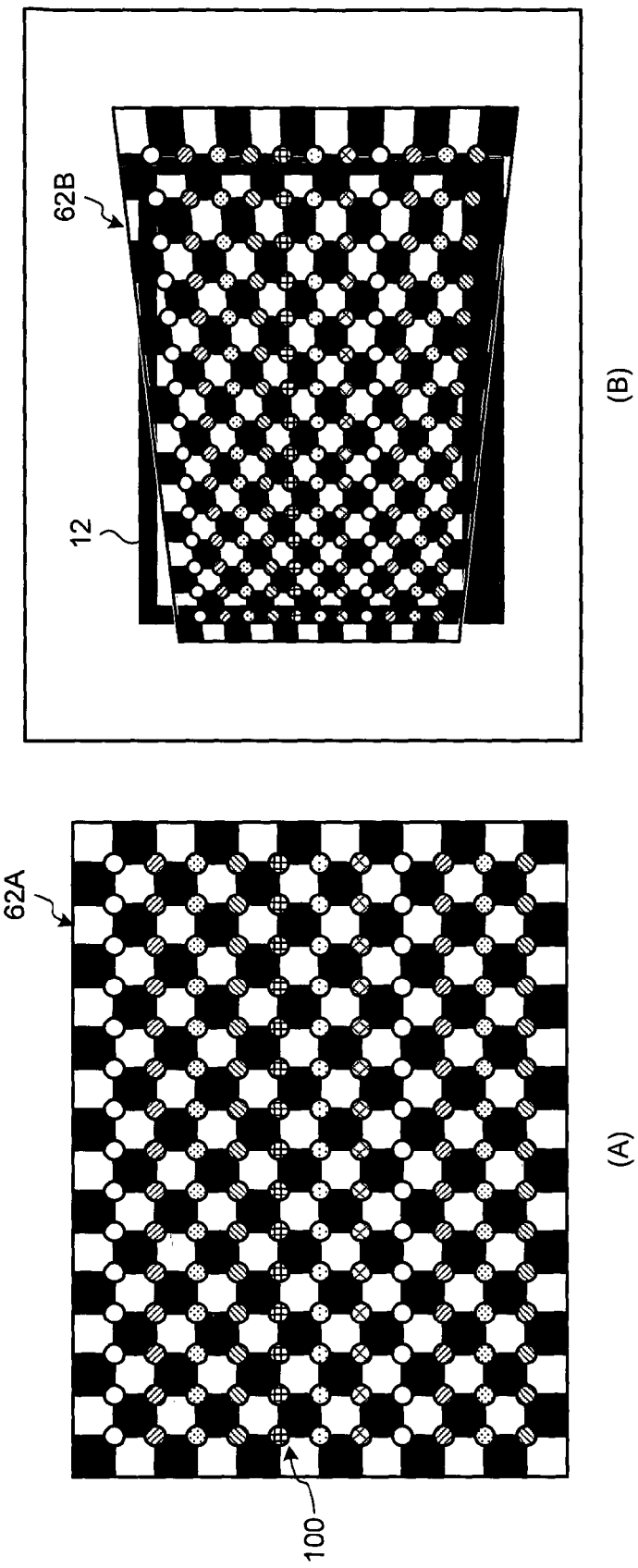
FIG. 3 is a schematic diagram illustrating an example of the first pattern image and a first photographed image.

FIG. 3 is a schematic diagram illustrating an example of the first pattern image 62A and a first photographed image 62B. The first pattern image 62A in which the plurality of first feature points 100 are arranged in a grid (refer to part (A) in FIG. 3) is projected on the projection surface 12. The first projection image, which is the image of the first pattern image 62A projected on the projection surface 12, is photographed by the photographing unit 16A. The acquisition unit 28 acquires the first photographed image 62B illustrated in part (B) in FIG. 3 from the photographing unit 16A. As illustrated in part (B) in FIG. 3, the first photographed image 62B has a distorted shape depending on the projection surface 12.

Figure 4:
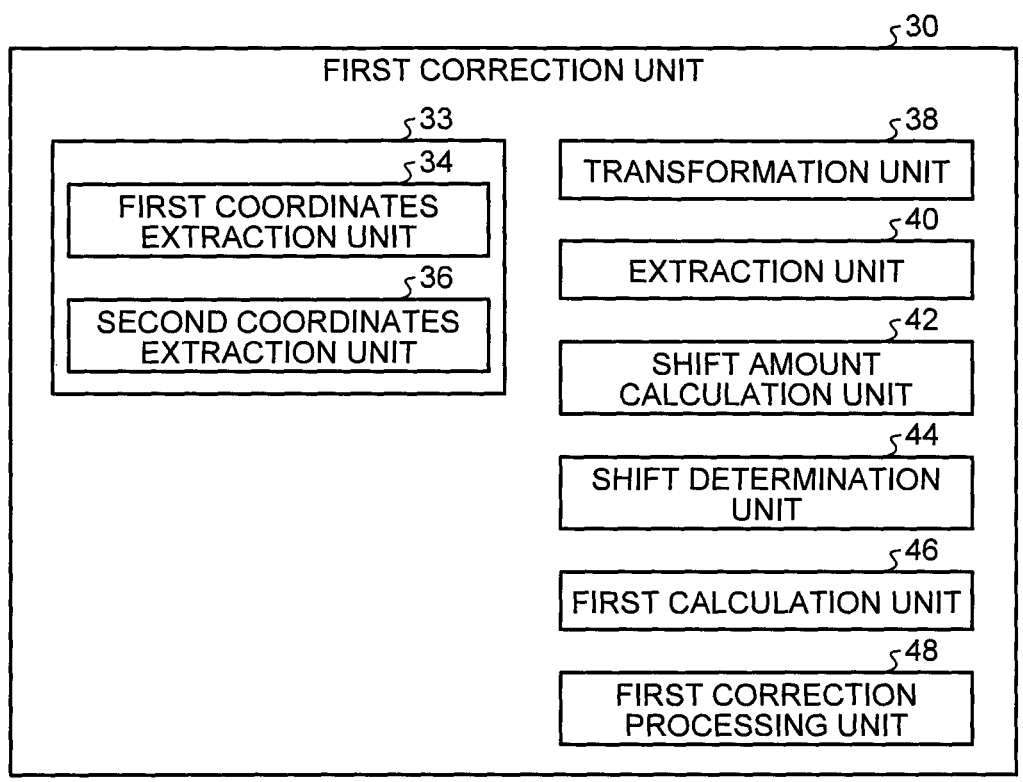
FIG. 4 is a schematic diagram illustrating a first correction unit.

Referring back to FIG. 1, the first correction unit 30 is a functional unit that performs calculation of the first correction information for correcting the projection target image. FIG. 4 is a schematic diagram illustrating the first correction unit 30.

The first correction unit 30 includes a coordinates extraction unit 33, a transformation unit 38, an extraction unit 40, a shift amount calculation unit 42, a shift determination unit 44, a first calculation unit 46, and a first correction processing unit 48.

The coordinates extraction unit 33 extracts the two-dimensional coordinates of the feature points included in the photographed image. The coordinates extraction unit 33 includes a first coordinates extraction unit 34 and a second coordinates extraction unit 36. The first coordinates extraction unit 34 extracts, from the first photographed image 62B, two-dimensional coordinates (hereinafter referred to as first coordinates) of the respective first feature points 100 included in the first photographed image 62B. Specifically, the first coordinates extraction unit 34 sets the position of the upper left vertex of the first photographed image 62B as the origin (0,0) of position information, and extracts the first coordinates of the respective first feature points 100 included in the first photographed image 62B.

The second coordinates extraction unit 36 extracts, from the second photographed image, the two-dimensional coordinates (hereinafter referred to as the second coordinates) of the respective second feature points 200 included in the second photographed image. Specifically, the second coordinates extraction unit 36 sets the position of the upper left vertex of a second photographed image 60B as the origin (0,0), and extracts the second coordinates of the respective second feature points 200 included in the second photographed image 60B.

The transformation unit 38 coordinate-transforms the second coordinates of the respective second feature points 200 of the second photographed image 60B, the second coordinates being extracted by the second coordinates extraction unit 36, into the first coordinates on the first photographed image 62B.

In the embodiment, the transformation unit 38 performs the transformation by calculating a projection transformation matrix Hcp.

Let the first coordinates indicating the position on the first photographed image 62B corresponding to the second coordinates (xc,yc) of the second feature point 200 of the second photographed image 60B be (xp,yp). The projection transformation matrix Hcp satisfies the following expression (1).

$$m_p \cong H_{cp} m_o \quad (1)$$

Expression (1) indicates that the right hand side and the left hand side are equal to each other in the homogeneous coordinate system (excluding constant multiplication of all elements). The projection transformation matrix Hcp is represented by the following expression (2).

$$H_{cp} = \begin{pmatrix} h_1 & h_2 & h_3 \\ h_4 & h_5 & h_6 \\ h_7 & h_8 & 1 \end{pmatrix} \quad (2)$$

Therefore, expression (1) can be represented by the following expression (3).

$$\begin{pmatrix} x_p \\ y_p \\ 1 \end{pmatrix} \cong \begin{pmatrix} h_1 & h_2 & h_3 \\ h_4 & h_5 & h_6 \\ h_7 & h_8 & 1 \end{pmatrix} \begin{pmatrix} x_c \\ y_c \\ 1 \end{pmatrix} \quad (3)$$

From expressions (1) to (3), the first coordinates (xp,yp) on the first photographed image 62B are represented by the following expressions (4) and (5).

$$x_p = \frac{h_1 x_c + h_2 y_c + h_3}{h_7 x_c + h_8 y_c + 1} \quad (4)$$

$$y_p = \frac{h_4 x_c + h_5 y_c + h_6}{h_7 x_c + h_8 y_c + 1} \quad (5)$$

In expressions (2) to (5), h1 to h8 are unknown coefficients of the projection transformation.

In the embodiment, the transformation unit 38 performs the coordinate transformation by calculating the first coordinates (xp,yp) on the first photographed image 62B for each of the nine second feature points 200 of the second photographed image 60B because the second pattern image 60A includes the nine second feature points 200 as described above.

Figure 5:
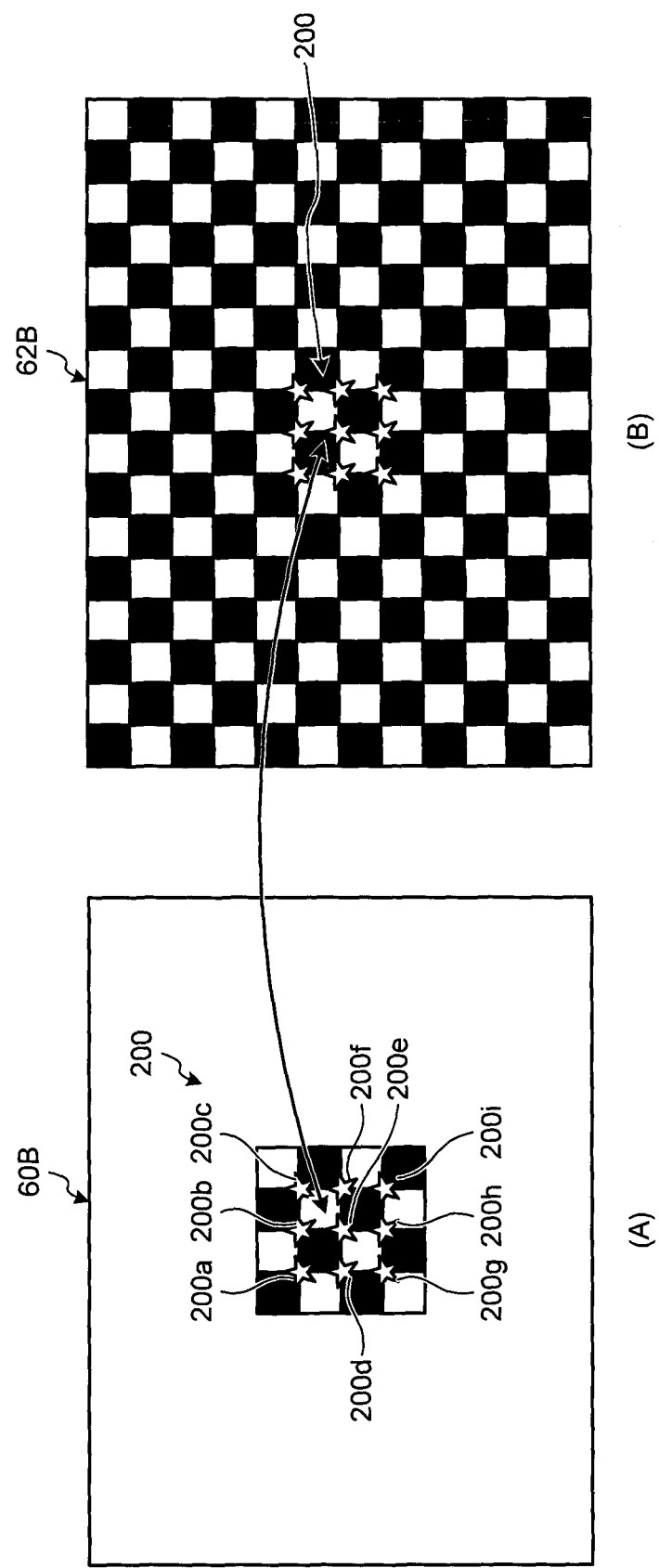
FIG. 5 is a schematic diagram illustrating coordinate transformation.

FIG. 5 is a schematic diagram illustrating the coordinate transformation performed by the transformation unit 38.

The second coordinates of the respective second feature points 200 (200a to 200i) in the second photographed image 60B illustrated in part (A) in FIG. 5 are coordinate-transformed into the first coordinates on the first photographed image 62B illustrated in part (B) in FIG. 5. As a result, the two-dimensional coordinates of the respective second feature points 200 on the first photographed image 62B are obtained.

The transformation unit 38 transforms the position coordinates of the respective second feature points 200 of the second photographed image 60B, the position coordinates being extracted by the second coordinates extraction unit 36, into the position coordinates on the first photographed image 62B. This transformation makes it possible to reflect the position coordinates of the respective second feature points 200 of the second photographed image 60B having no distortions to the positions on the first photographed image 62B.

Referring back to FIG. 4, the extraction unit 40 extracts a second connected component and a first connected component. The second connected component is a component in which the second feature points 200 in the second photographed image 60B after the coordinate transformation by the transformation unit 38 are connected in a predetermined direction. The second connected component is represented by an image of a line of the second feature points 200, which are coordinate-transformed into the first coordinates by the transformation unit 38, connected in the predetermined direction.

The first connected component is a component in which, in the first photographed image 62B, the first feature points 100 at the positions corresponding to the respective second feature points 200 included in the second connected component are connected. The first connected component is represented by an image of a line of the connected first feature points 100.

Figure 6:
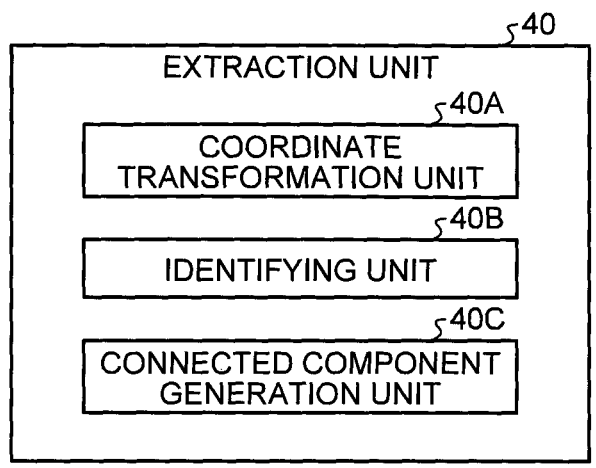
FIG. 6 is a schematic diagram illustrating an extraction unit.

FIG. 6 is a schematic diagram illustrating the extraction unit 40. The extraction unit 40 includes a coordinate transformation unit 40A, an identifying unit 40B, and a connected component generation unit 40C.

Figure 7:
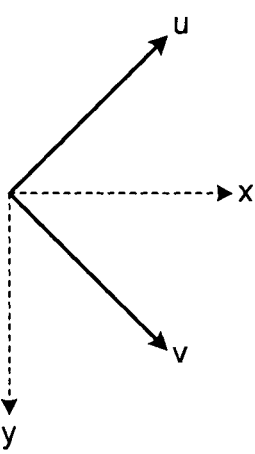
FIG. 7 is an explanatory view of a (u,v) coordinate system.

The coordinate transformation unit 40A transforms the first coordinates of the respective first feature points 100 of the first photographed image 62B and the first coordinates, which are coordinate-transformed by the transformation unit 38, of the respective second feature points 200 of the second photographed image 60B into the coordinates in a (u,v) coordinate system. FIG. 7 is an explanatory view of the (u,v) coordinate system. In FIG. 7, the first coordinates are determined by the coordinate system represented by the x axis and the y axis. In FIG. 7, the right direction of the x axis is the positive direction of the x axis while the downward direction of the y axis is the positive direction of the y axis. In the following description, C is the total number of feature points in each photographed image, A[i] is the i-th feature point, and the first coordinates of the A[i] are represented as (x[i],y[i]).

The (u,v) coordinate system is obtained by rotating the coordinate system of the first coordinates (the (x,y) coordinate system in FIG. 7) by a predetermined angle (e.g., 45 degrees) about the fixed origin (0,0).

The coordinate transformation unit 40A transforms the first coordinates of the respective first feature points 100 of the first photographed image 62B and the first coordinates, which are coordinate-transformed by the transformation unit 38, of the respective second feature points 200 of the second photographed image 60B into the coordinates in the (u,v) coordinate system using the following expressions (6) and (7).

$$u[i] = (x[i] - y[i])/\sqrt{2} \quad (6)$$

$$v[i] = (x[i] - y[i])/\sqrt{2} \quad (7)$$

In expressions (6) and (7), i is an integer equal to or larger than one. In expressions (6) and (7), A[i] is the i-th feature point, and the first coordinates of the A[i] are represented as (x[i],y[i]), as described above. The coordinates in the (u,v) coordinate system are represented as (u[i],v[i]).

Figure 8:
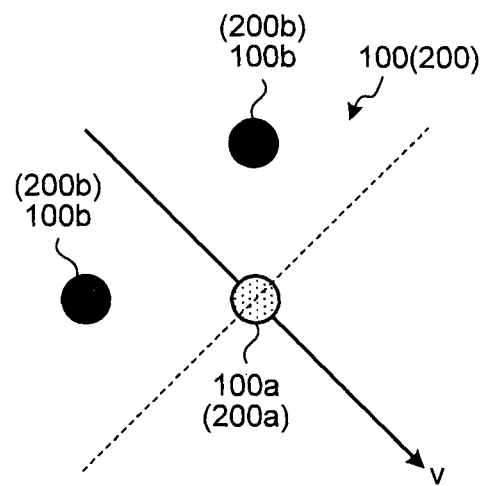
FIG. 8 is an explanatory view of the coordinate transformation.

FIG. 8 is an explanatory view of the transformation of the coordinates into the (u,v) coordinate system. The reason why the coordinate transformation unit 40A transforms the coordinates into the (u,v) coordinate system is to know a connection rule in the arrangement of the feature points in the image before the distortion occurs therein. As illustrated in FIG. 8, after the transformation of the coordinates into the (u,v) coordinate system, a first feature point 100b having a v coordinate smaller than that of a first feature point 100a is inevitably located on the upper side or the left side of the first feature point 100*a* when attention is paid to the v coordinate of the first feature point 100. Likewise, when attention is paid to the v coordinate of the second feature point 200, the second feature point 200*b* having a v coordinate smaller than that of the second feature point 200*a* is inevitably located on the upper side or the left side of the second feature point 200*a*.

Referring back to FIG. 6, the identifying unit 40B identifies the adjacent first feature point 100 about the first feature points 100 transformed into the (u,v) coordinate system. The identifying unit 40B identifies the adjacent second feature point 200 about the second feature points 200 transformed into the (u,v) coordinate system.

Specifically, the identifying unit 40B sorts the first feature points 100 and the second feature points 200 that are transformed into the (u,v) coordinate system in the order from the smallest value to the largest value based on their v coordinates. The sorted first feature points 100 are sequentially numbered with i (i is an integer and $1 \leq i \leq C$) from the smallest value of the v coordinate. Here, C is the total number of first feature points 100 included in the first photographed image 62B.

Likewise, the sorted second feature points 200 are sequentially numbered with i (i is an integer and $1 \leq i \leq C$) from the smallest value of the v coordinate. Here, C is the total number of second feature points 200 included in the second photographed image 60B.

The identifying unit 40B sequentially selects the second feature point 200 out of the sorted second feature points 200 after being coordinate-transformed into the (u,v) coordinate system, and identifies the adjacent second feature points 200 in two directions, one of which is adjacent on the upper side and the other of which is adjacent on the left side. The direction in which the adjacent second feature point 200 is identified may be at least two directions as long as the positions of all of the second feature points 200 can be identified. For example, the identification may be performed in the upper and the right directions, the right and the lower directions, and may be performed in all of the four directions. In the sorting described above, the feature points are sorted in the order from the smallest value to the largest value based on their v coordinates so as to readily identify the feature points located on the upper and the left sides because the directions for the identification are the upper and the left directions. The coordinates used for the sorting may be changed in accordance with the direction for the identification.

Likewise, the identifying unit 40B sequentially selects the first feature point 100 out of the sorted first feature points 100 after being coordinate-transformed into the (u,v) coordinate system, and identifies the adjacent first feature points 100 in two directions of the upper and the left side directions.

The connected component generation unit 40C produces the second connected components and the first connected components. The connected component generation unit 40C performs labeling, in which the first feature points 100 or the second feature points 200 are connected, to produce the second connected components and the first connected components.

Specifically, the connected component generation unit 40C connects the adjacent first feature points 100 identified by the identifying unit 40B in a-predetermined first direction, extracts the connected components, and labels the respective connected components. As a result, the connected component generation unit 40C produces a plurality of first connected components. The connected component generation unit 40C connects the adjacent second feature points 200 identified by the identifying unit 40B in the first direction, extracts the connected components, and labels the respective connected components. As a result, the connected component generation unit 40C produces a plurality of second connected components.

Generally, the labeling is referred to the process in which adjacent black pixels in a binary image are connected and the black pixel connected components are extracted. In the labeling used in the embodiment, the targets to be connected are the feature points instead of the black pixels. The concrete procedure of the labeling in the embodiment can follow, without any change, those of the known labeling techniques that are widely used.

Figure 9:
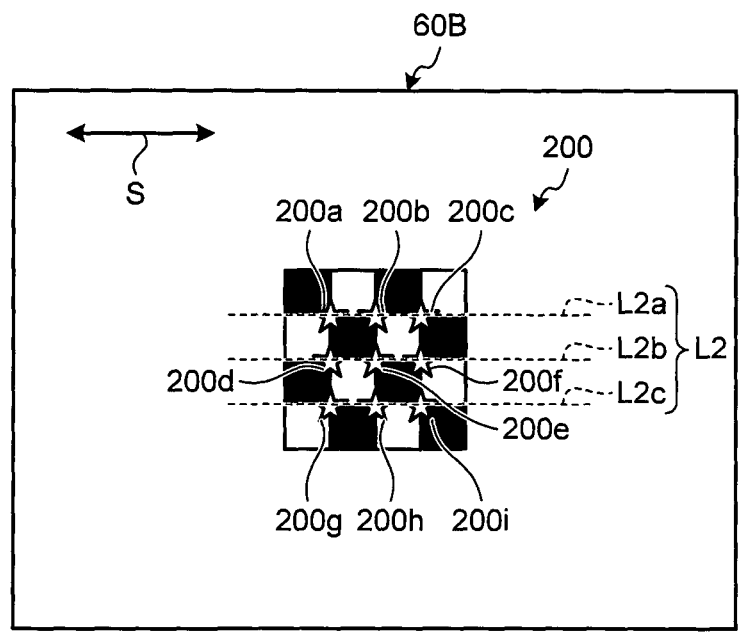
FIG. 9 is a schematic diagram illustrating an example of a generation result of second connected components.

FIG. 9 is a schematic diagram illustrating an example of a generation result of a plurality of second connected elements L2. As illustrated in FIG. 9, the connected component generation unit 40C connects the sorted second feature points 200 after being transformed into the first coordinates and further into the (u,v) coordinate system in the first direction (in the arrow S direction (left-right direction) in FIG. 9) to generate the plurality of second connected components L2 (L2*a* to L2*c*). The connected component generation unit 40C then selects the second connected component L2*b* out of the second connected components L2 (L2*a* to L2*c*).

In the embodiment, the second connected component L2*b*, which passes through the second feature points 200 located in the area corresponding to the center of the image, is selected out of the second connected components L2 (L2*a* to L2*c*).

Figure 10:
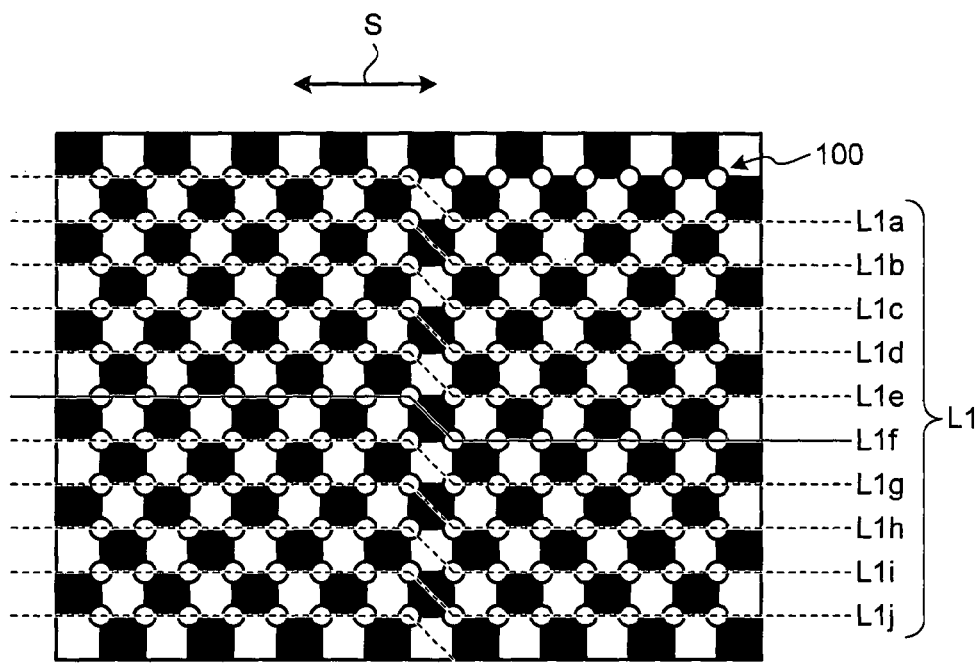
FIG. 10 is a schematic diagram illustrating an example of a generation result of first connected components.

FIG. 10 is a schematic diagram illustrating an example of a generation result of a plurality of first connected elements L1. As illustrated in FIG. 10, the connected component generation unit 40C connects the sorted first feature points 100 after being transformed into the (u,v) coordinate system in the first direction (in the arrow S direction (left-right direction) in FIG. 10) to generate the plurality of first connected components L1 (L1*a* to L1*j*). The connected component generation unit 40C selects, out of the first connected components L1 (L1*a* to L1*j*), the first connected component L1*f* that includes the first feature points 100 corresponding to the second feature points 200 included in the second connected component L2*b* selected as described above.

Figure 11:
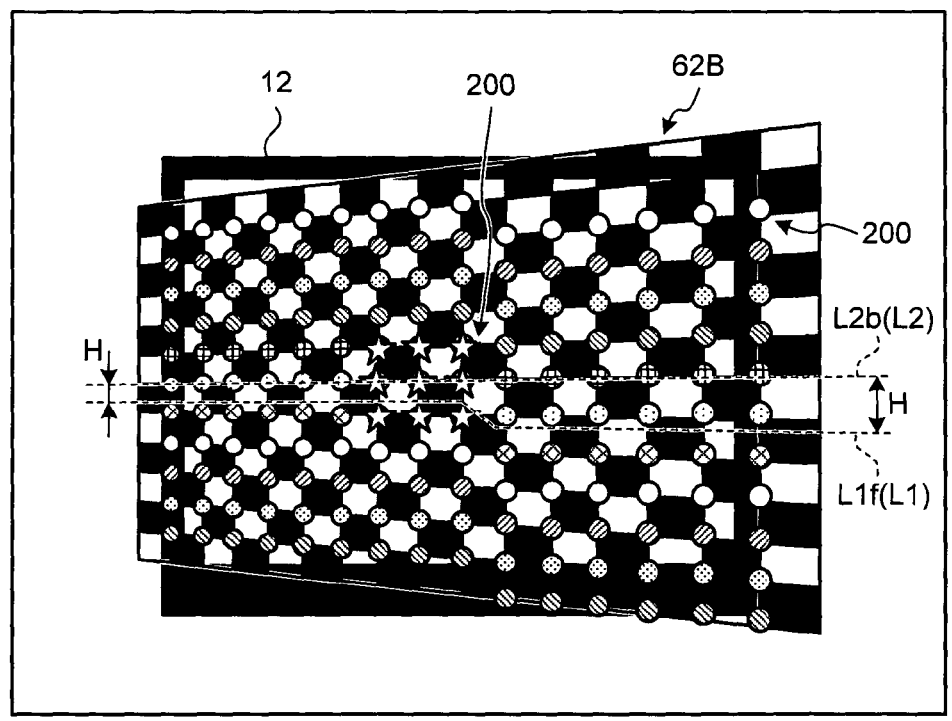
FIG. 11 is an explanatory view of a shift of the first connected component with respect to the second connected component.

Referring back to FIG. 4, the shift amount calculation unit 42 calculates a shift amount of the first connected component L1*f* with respect to the second connected component L2*b*. FIG. 11 illustrates that the respective first feature points 100 included in the first connected component L1*f* are shifted with respect to the second connected component L2*b* by the amounts corresponding to shift amounts H. As illustrated in FIG. 11, the shift amount H differs in value from position to position of the first feature point 100. The details of a calculation method of the shift amount are described later.

Referring back to FIG. 4, the shift determination unit 44 determines whether any shift occurs on the basis of the shift amount calculated by the shift amount calculation unit 42. When the shift determination unit 44 determines that a shift has occurred, the first calculation unit 46 calculates the first correction information for correcting the projection target image on the basis the shift amount calculated by the shift amount calculation unit 42. The first correction processing unit 48 corrects the projection target image using the calculated first correction information.

Figure 12:
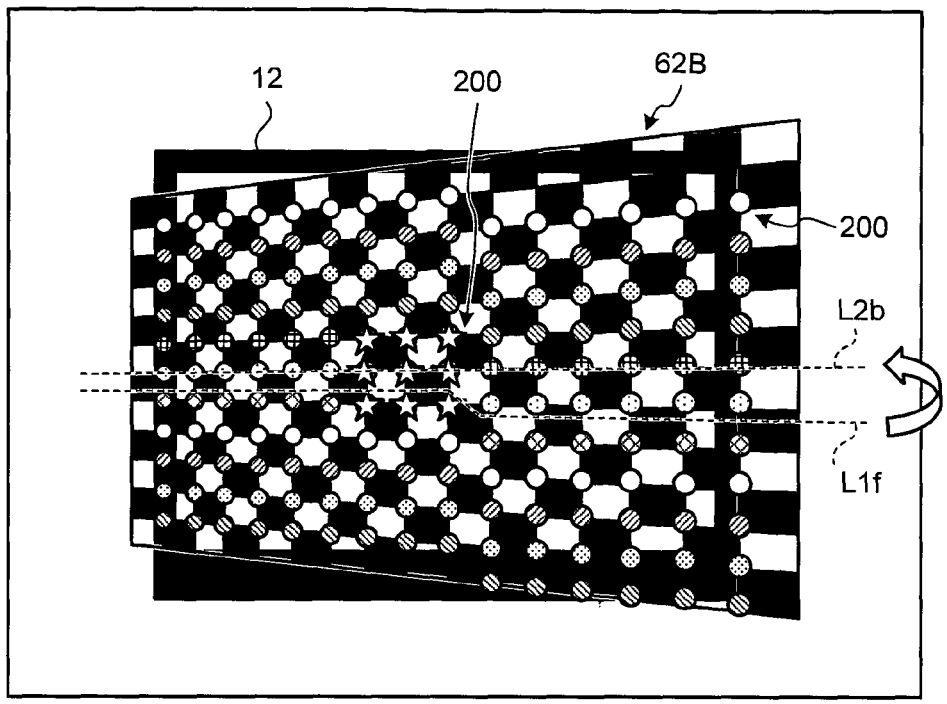
FIG. 12 is an explanatory view of correction performed by a first correction processing unit.

FIG. 12 is an explanatory view of the correction performed by the first correction processing unit 48. As illustrated in FIG. 12, the first correction processing unit 48 corrects, on the basis of the shift amount, the pixel position of the pixel corresponding to the first feature point 100 in the projection target image for each pixel such that the shift according to the shift amount is cancelled.

Referring back to FIG. 1, the second correction unit 32 is a functional unit that performs calculation of second correction information for further correcting the projection target image corrected by the first correction unit 30.

Figure 13:
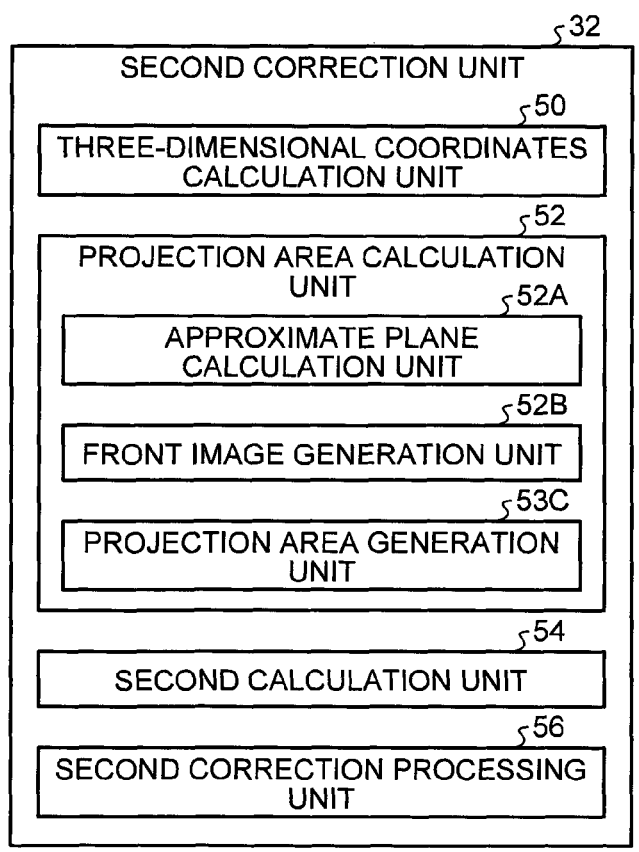
FIG. 13 is a schematic diagram illustrating a second correction unit.

FIG. 13 is a schematic diagram illustrating the second correction unit 32.

The second correction unit 32 includes a three-dimensional coordinates calculation unit 50, a projection area calculation unit 52, a second calculation unit 54, and a second correction unit 56.

The three-dimensional coordinates calculation unit 50 calculates the three-dimensional coordinates of the first feature points 100 in the first projection image, which is the image of the first pattern image 62A projected on the projection surface 12, using the first pattern image 62A and the first photographed image 62B. The calculation of the three-dimensional coordinates is performed using a known technique. For example, the calculation of the three-dimensional coordinates is performed using a typical stereo distance measuring method of a projector and a camera (reference paper: Takahashi, Aoki, et al., Tohoku university, "An experimental study on geometric correction for projected images").

Figure 14:
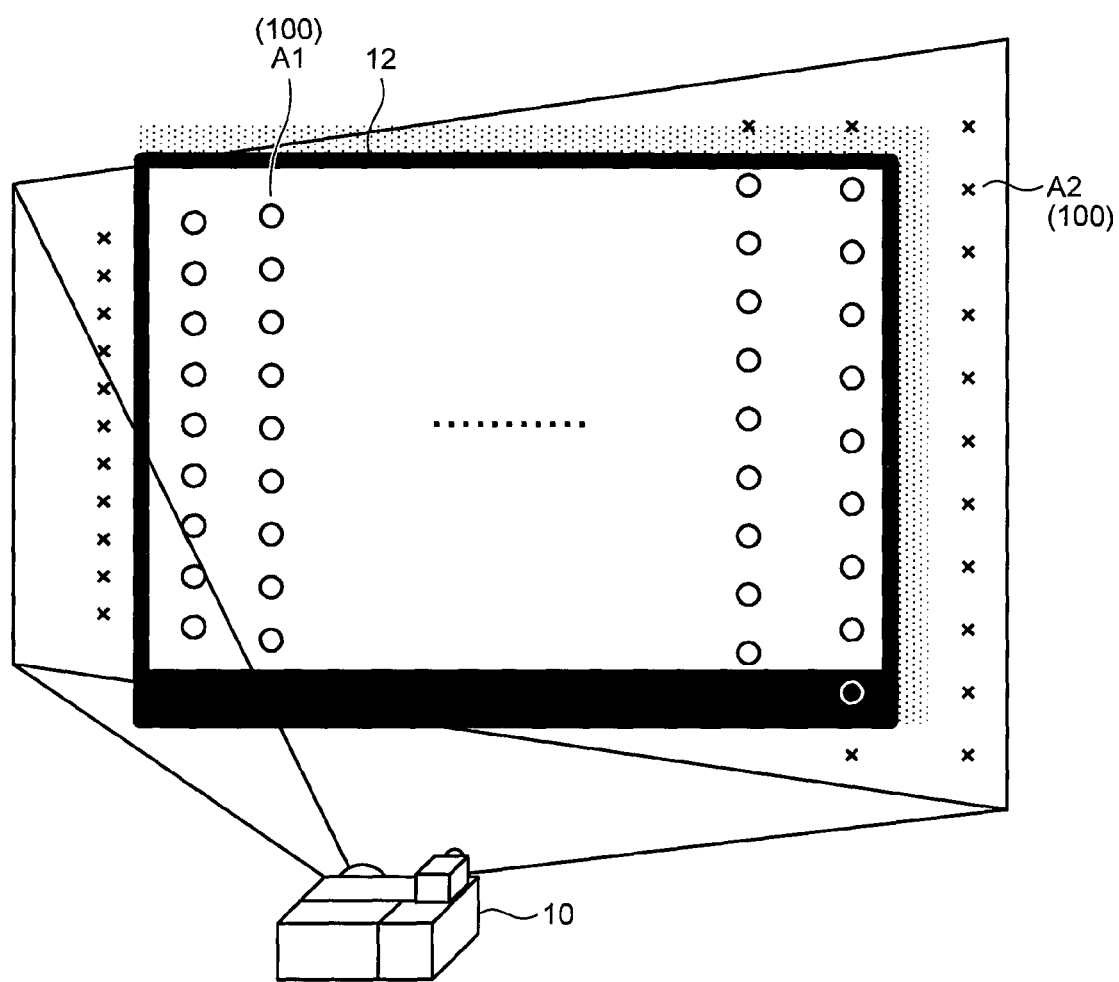
FIG. 14 is an explanatory view of a projection area.
Figure 15:
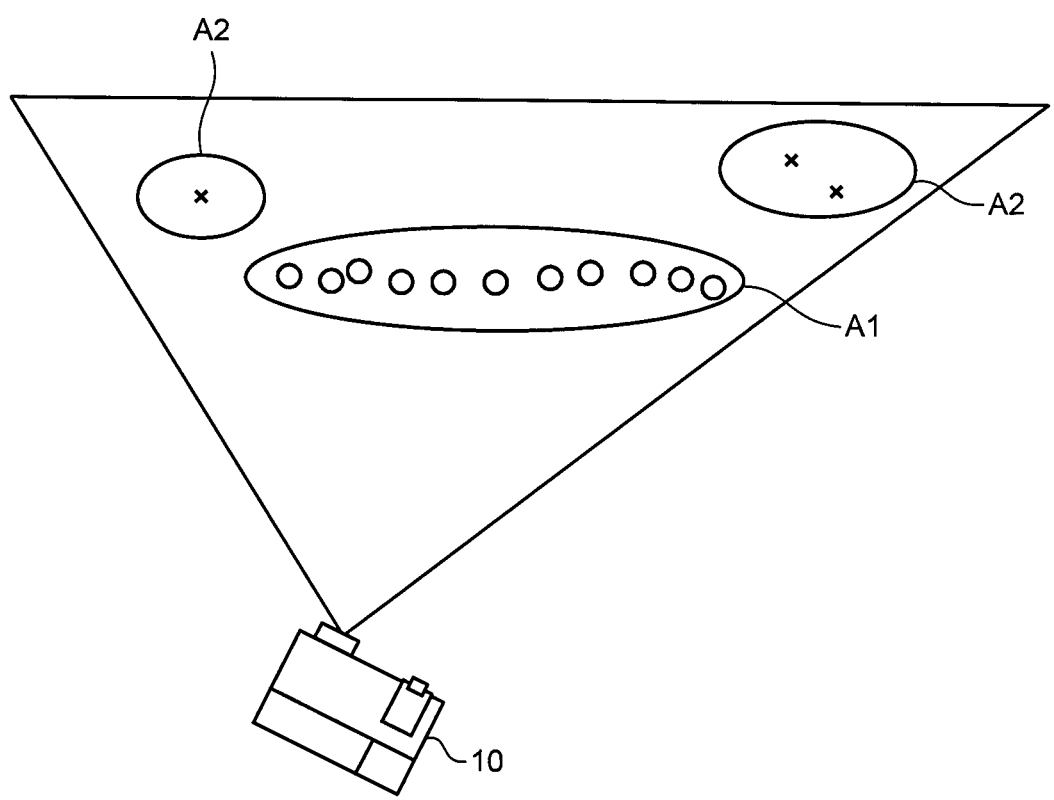
FIG. 15 is an explanatory view of the projection area.

The projection area calculation unit 52 calculates a projection area on which the projection target image is projected. FIGS. 14 and 15 are explanatory views of the projection area. As illustrated in FIGS. 14 and 15, when the projection target image is projected on the projection surface 12, a group A1 of the first feature points 100 (the circles in FIGS. 14 and 15) projected on the projection surface 12 are determined to be projected without any problem, while a group A2 of the first feature points 100 (the x-shaped marks in FIGS. 14 and 15) projected at positions off the projection surface 12 are determined to be projected at inappropriate positions.

Referring back to FIG. 13, the projection area calculation unit 52 thus calculates the projection area such that the first feature points 100 are located in the area corresponding to the projection surface 12 in a three-dimensional space.

The projection area calculation unit 52 includes an approximate plane calculation unit 52A, a front image generation unit 52B, and a projection area generation unit 53C.

The approximate plane calculation unit 52A calculates an approximate plane approximated to a plane including the projection surface 12. The details of a calculating method of the approximate plane are described later.

The front image generation unit 52B produces a front image obtained by photographing the approximate plane calculated by the approximate plane calculation unit 52A from the normal direction of the approximate plane.

The front image generation unit 52B extracts the first feature points 100 located in the approximate plane using the three-dimensional coordinates of the respective first feature points 100 calculated by the three-dimensional coordinates calculation unit 50 and the calculated approximate plane. The front image generation unit 52B projects, on a two-dimensional plane, the three-dimensional point group of the first feature points 100 that are located in the approximate plane and identified by the three-dimensional coordinates using a perspective projection transformation matrix P to produce the front image.

The perspective projection transformation matrix P is represented by the following expression (8).

$$P=A(Rt) \qquad (8)$$

In expression (8), A indicates the internal parameter, R indicates the rotation matrix serving as an external parameter, and t indicates the parallel translation vector.

A virtual camera is assumed to photograph the approximate plane from the normal direction thereof to take a front image. The internal parameter A is the matrix (3×3) defined using optical axis coordinates, scales of rows and columns of an imaging element, and the focal length f of the virtual camera. The rotation matrix R is the matrix (3×3) that indicates the rotation from the actual photographing apparatus 16 provided to the image processing system 10 to the virtual camera.

The parallel translation vector t is the vector (3×1) that indicates the parallel translation from the actual photographing apparatus 16 to the virtual camera.

The projection area generation unit 53C produces the projection area on which the projection image is projected using the approximate plane calculated by the approximate plane calculation unit 52A and the front image produced by the front image generation unit 52B.

The second calculation unit 54 calculates the second correction information for correcting the projection target image such that the projection image is within the projection area. The second correction unit 56 corrects, on the basis of the second correction information, the projection target image corrected on the basis of the first correction information.

The following describes a procedure of image processing performed by the image processing apparatus 18 in the embodiment.

Figure 16:
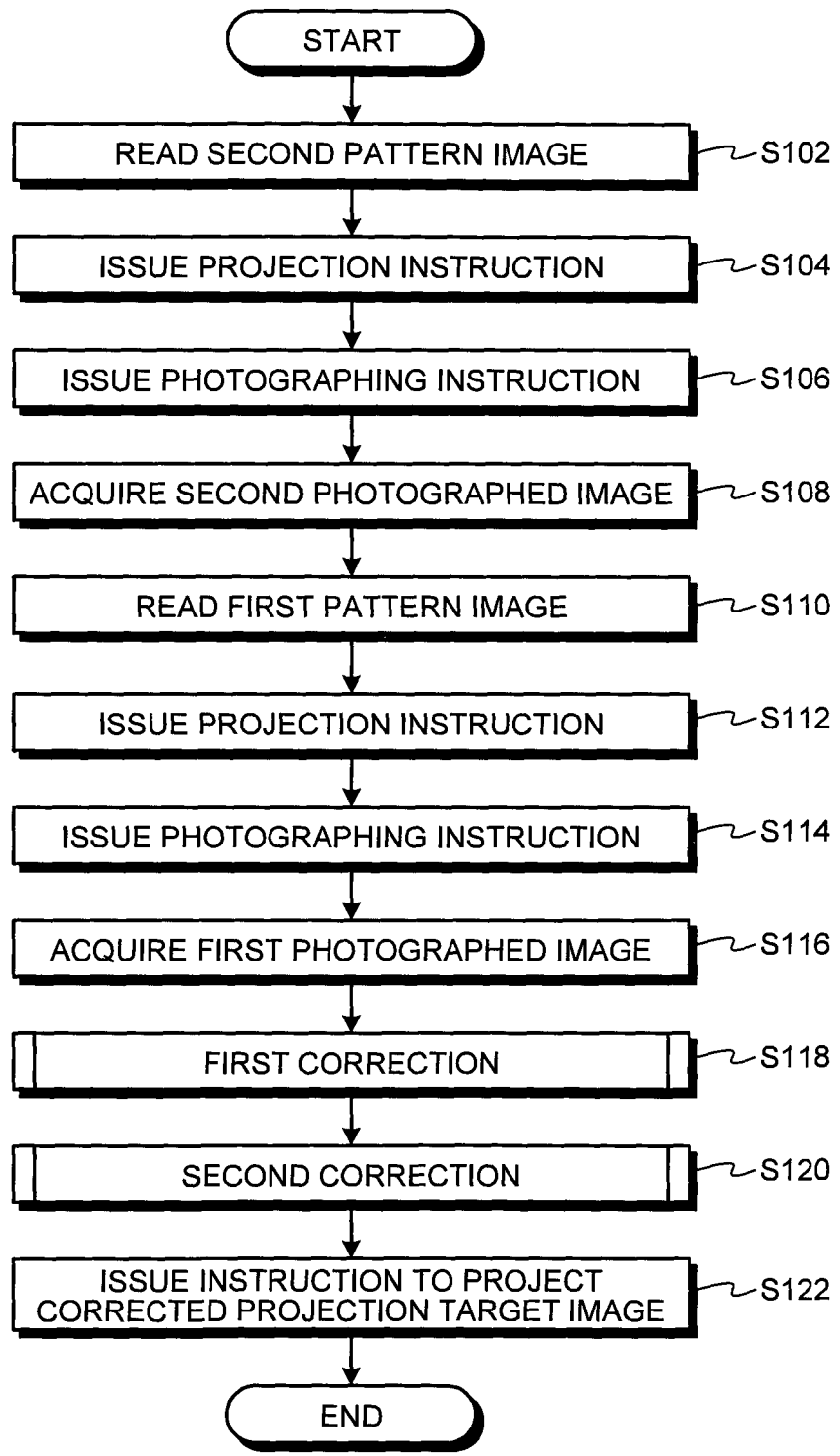
FIG. 16 is a flowchart illustrating a procedure of image processing.

FIG. 16 is a flowchart illustrating a procedure of the image processing performed by the image processing apparatus 18.

The projection control unit 24 reads the second pattern image 60A stored in the storage unit 22 (step S102). The projection control unit 24 outputs, to the projection unit 14A, a signal that indicates a projection instruction to project the second pattern image 60A read at step S102 on the projection surface 12 (step S104). The projection unit 14A, which receives the signal indicating the projection instruction, projects the second pattern image 60A included in the received projection instruction on the projection surface 12.

The photographing control unit 26 outputs a photographing instruction to the photographing unit 16A (step S106). The photographing unit 16A, which receives the photographing instruction, photographs the projection image (the second projection image) projected on the projection surface 12, and outputs the second photographed image 60B obtained by photographing to the controller 20.

The acquisition unit 28 acquires the second photographed image 60B from the photographing unit 16A (step S108). The acquisition unit 28 stores the acquired second photographed image 60B in the storage unit 22.

The projection control unit 24 reads the first pattern image 62A stored in the storage unit 22 (step S110). The projection control unit 24 outputs, to the projection unit 14A, a signal that indicates the projection instruction to project the first pattern image 62A read at step S110 on the projection surface 12 (step S112). The projection unit 14A, which receives the signal indicating the projection instruction, projects the first pattern image 62A included in the received projection instruction on the projection surface 12.

The photographing control unit 26 outputs the photographing instruction to the photographing unit 16A (step S114). The photographing unit 16A, which receives the photographing instruction, photographs the projection image (the first projection image) projected on the projection surface 12, and outputs the first photographed image 62B obtained by photographing to the controller 20.

The acquisition unit 28 acquires the first photographed image 62B from the photographing unit 16A (step S116). The acquisition unit 28 stores the acquired first photographed image 62B in the storage unit 22.

The first correction unit 30 performs first correction processing (step S118). The second correction unit 32 performs second correction (step S120). The projection control unit 24 outputs, to the projection unit 14A, the signal indicating the instruction to project the projection target image corrected by the process at step S118 and step S120 (step S122). In the process at step S122, the projection unit 14A, which receives the signal indicating the projection instruction, projects the projection target image after the correction included in the received signal on the projection surface 12. As a result, the projection target image in which distortions are suppressed is projected on the projection surface 12, which ends this routine.

Figure 17:
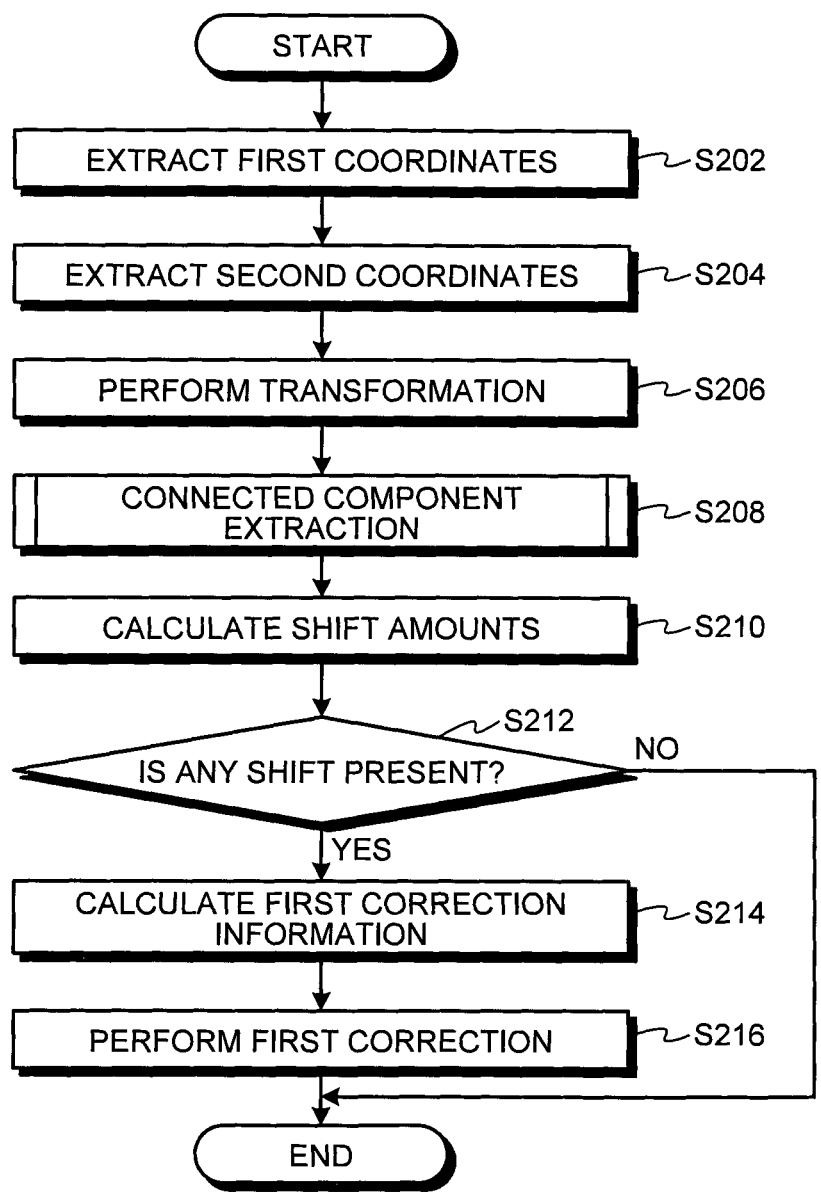
FIG. 17 is a flowchart illustrating a procedure of first correction.

The following describes a procedure of the first correction at step S118. FIG. 17 is a flowchart illustrating the procedure of the first correction performed by the first correction unit 30.

The first coordinates extraction unit 34 extracts the first coordinates of the respective first feature points 100 included in the first photographed image 62B from the first photographed image 62B stored in the storage unit 22 (step S202).

The second coordinates extraction unit 36 extracts the second coordinates of the respective second feature points 200 included in the second photographed image 60B from the second photographed image 60B stored in the storage unit 22 (step S204).

The transformation unit 38 performs the transformation in which the transformation unit 38 coordinate-transforms the second coordinates of the respective second feature points 200 of the second photographed image 60B, the second coordinates being extracted by the second coordinates extraction unit 36, into the first coordinates on the first photographed image 62B (step S206).

The extraction unit 40 performs the connected component extraction in which the extraction unit 40 extracts the second connected components and the first connected components (step S208). The connected component extraction will be described in detail later.

The shift amount calculation unit 42 calculates the shift amounts of the first connected component L1f with respect to the second connected component L2b (step S210). The shift amount calculation unit 42 calculates the shift amount of the first feature point 100 that is included in the first connected component L1f and corresponds to the second feature point 200 included in the second connected component L2b with respect to the second feature point 200 for each of the respective first feature points 100 included in the first connected component L1f, thereby calculating the shift amounts of the first connected element L1f with respect to the second connected element L2b. Specifically, each shift amount is obtained by calculating the distance between the second feature point 200 included in the second connected component L2b and the first feature point 100 that is included in the first connected element L1f and corresponds to the second feature point 200.

The shift determination unit 44 determines whether any shift of the first connected component L1f with respect to the second connected component L2b is present (step S212). At step S212, the shift determination unit 44 determines whether the shift amount calculated at step S210 is "0 (zero)" as the determination at step S212. The state where the shift amount is "0" indicates the state where the first connected component L1f and the second connected component L2b are exactly overlapped with each other as a whole from one side to the other side in the longitudinal direction. If a negative determination is made at step S212 (No at step S212), this routine ends.

If a positive determination is made at step S212 (Yes at step S212), the process flow proceeds to step S214. At step S214, the first calculation unit 46 calculates the first correction information for correcting the projection target image on the basis of the shift amounts calculated at step S210 (step S214). The first calculation unit 46 calculates, as the first correction information, correction values on the basis of the shift amounts being calculated at step S210 such that the shift amount is cancelled. Specifically, the first calculation unit 46 calculates the first correction information for correcting the values of the position coordinates of the respective second feature points 200 such that the shift amounts of the respective second feature points 200 become "0" in a direction (a direction toward the positions of the corresponding respective first feature points 100) using the shift amounts of the respective second feature points 200 calculated by the shift amount calculation unit 42.

The first correction processing unit 48 performs the first correction for correcting the projection target image using the first correction information calculated at step S214 (step S216), which ends this routine.

As a result of the processes performed from step S202 to step S216, the positions corresponding to the respective first feature points 100 in the projection target image are changed such that the first feature points 100 included in the first connected component L1f illustrated in FIG. 12 coincide with the positions of the second feature points 200 included in the second connected component L2b. The first feature points 100 included in the other first connected components L1 are also subjected to the first correction in the projection target image in the same manner as described above, the first feature points 100 being arranged in a direction perpendicular to the second connected component L2b as illustrated in FIGS. 10 and 12.

Figure 18:
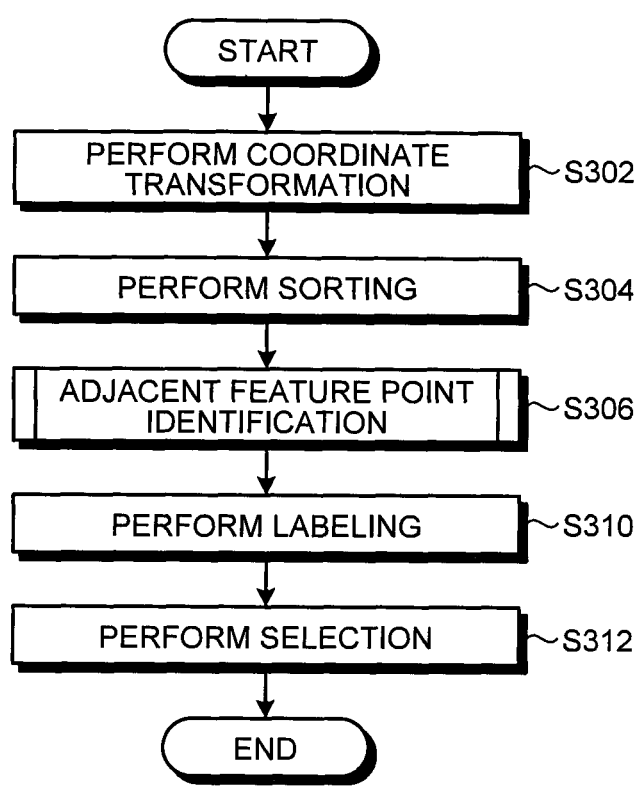
FIG. 18 is a flowchart illustrating a procedure of connected component extraction.

The following describes the connected component extraction performed at step S208. FIG. 18 is a flowchart illustrating a procedure of the connected component extraction performed by the extraction unit 40.

The coordinate transformation unit 40A performs the coordinate transformation (step S302). At step S302, the coordinate transformation unit 40A transforms the first coordinates of the respective first feature points 100 of the first photographed image 62B and the first coordinates coordinate-transformed by the transformation unit 38 of the respective second feature points 200 of the second photographed image 60B into the coordinates in the (u,v) coordinate system.

The identifying unit 40B performs the sorting (step S304). The identifying unit 40B sorts the first feature points 100 and the second feature points 200 that are transformed into the (u,v) coordinate system in the order from the smallest value to the largest value based on their v coordinates.

The identifying unit 40B performs adjacent feature point identification (step S306). At step S306, the identifying unit 40B sequentially selects the second feature point 200 out of the sorted second feature points 200 after being coordinate-transformed into the (u,v) coordinate system, and identifies the adjacent second feature points 200 in two directions, one of which is adjacent on the upper side and the other of which is adjacent on the left side.

The connected component generation unit 40C performs the labeling (step S310). As a result of the labeling, the connected component generation unit 40C produces the second connected components and the first connected components.

The connected component generation unit 40C selects the second connected component L2b out of the plurality of second connected components L2 (L2a to L2c), and the first connected component L1f out of the plurality of first connected component L1 (L1a to L1j), the first connected component L1f including the first feature points 100 corresponding to the second feature points 200 included in the above-described selected second connected component L2b (step S312), which ends this routine.

Figure 19:
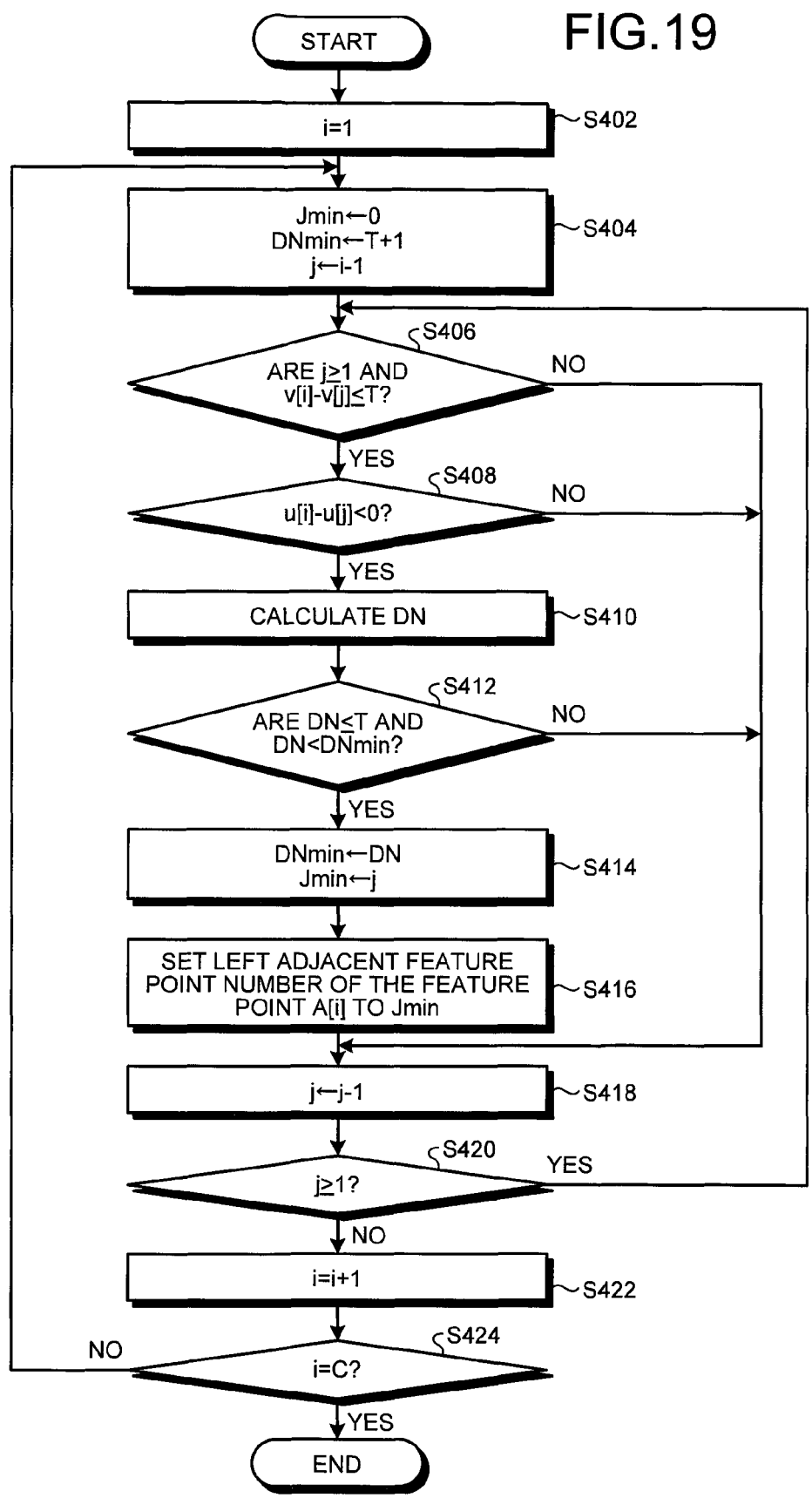
FIG. 19 is a flowchart illustrating a procedure of adjacent feature point identification.
Figure 20:
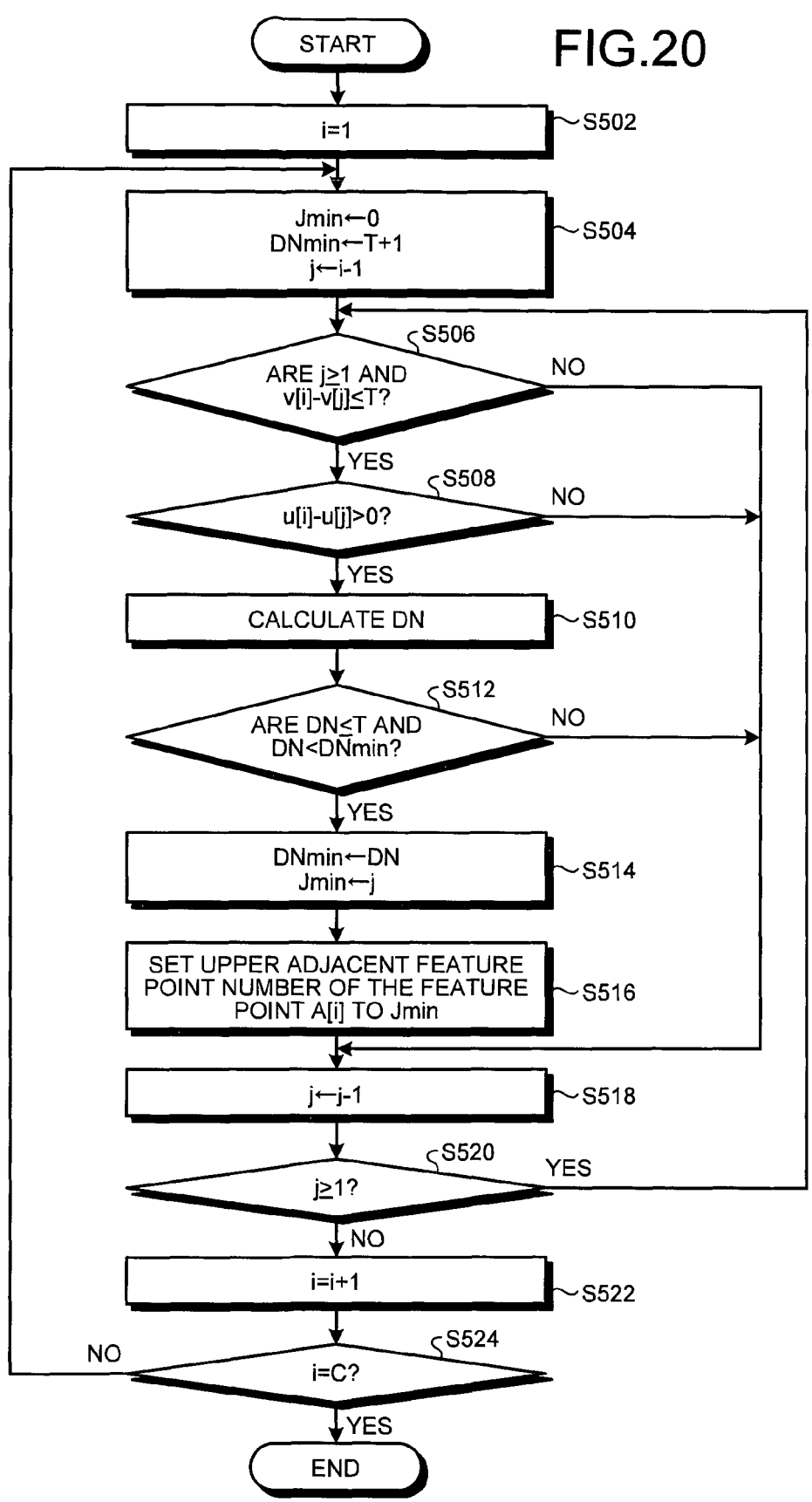
FIG. 20 is a flowchart illustrating a procedure of the adjacent feature point identification.

The following describes a procedure of the adjacent feature point identification performed by the identifying unit 40B. FIGS. 19 and 20 are flowcharts illustrating the procedure of the adjacent feature point identification performed by the identifying unit 40B. The identifying unit 40B performs the processes illustrated in FIGS. 19 and 20 on the adjacent points of the first feature points 100 and the second feature points 200.

FIG. 19 is the flowchart illustrating a process procedure when the feature point adjacent on the left side of a certain selected feature point is identified. FIG. 20 is the flowchart illustrating a process procedure when the feature point adjacent on the upper side of a certain selected feature point is identified.

As illustrated in FIG. 19, the identifying unit 40B sets i to one in order to perform the process from the first feature point 100, which is the first in the order (i=1) (step S402). Here, i is the number assigned to the first feature point 100 after being sorted. The identifying unit 40B sets Jmin to zero, DNmin to a value larger than T by one, and j to a value smaller than i by one. Jmin indicates the number of the feature point at the closest distance. DNmin is a threshold that indicates the minimum distance between the feature points. T is a value preliminarily and temporary set as a maximum of the distances between the feature points. j is the number of the j-th feature point, which is compared with the i-th feature point (step S404). The value of j is smaller than that of i because only the first feature point 100 possibly located on the left side of the i-th feature point is the processing target.

The identifying unit 40B determines whether j is equal to or larger than one and (v[i]−v[j]) is equal to or smaller than the threshold T (step S406). When j is smaller than one, i.e., j is zero, the selected feature point is the starting point or the comparison of the selected feature point A[i] with all of the feature points A[j] possibly located on the left side is completed. The determination of whether (v[i]−v[j]) is equal to or smaller than the threshold T excludes, from the subsequent processing targets, the feature point A[j] having a distance larger than the predetermined threshold T from the selected feature point A[j], thereby reducing a load on the processing.

If it is determined that j is equal to or larger than one and (v[i]−v[j]) is equal to or smaller than the threshold T (Yes at step S406), the identifying unit 40B determines whether (u[i]−u[j]) is smaller than zero (step S408). The value of (u[i]−u[j]) is used for determining whether the j-th first feature point 100a is present on the upper side of the i-th first feature point 100a in the coordinate space. The processing illustrated in FIG. 19 identifies the feature point adjacent on the left side of the selected first feature point 100. Thus, the first feature points 100 having a value of (u[i]−u[j]) smaller than zero are searched for. If it is determined that (u[i]−u[j]) is smaller than zero (Yes at step S408), DN is calculated using the following expression (9). DN is a norm of a vector between the coordinates of the two feature points of A[i] and A[j](step S410).

$$DN = \mathrm{SQRT}\{(u[j]-u[i])^2 + (v[j]-v[i])^2\} \qquad (9)$$

Then, the identifying unit 40B determines whether DN is equal to or smaller than T and DN<DNmin (step S412). When the distance between the feature pints is larger than T, which is the predetermined threshold, as a result of the determination of whether DN is equal to or smaller than T, the resulting feature point is excluded from the subsequent processing targets, thereby reducing a load on the processing. As a result of the comparison of DN with DNmin, a determination is made whether the feature point is located at the closest distance out of the feature points having been compared with the selected feature point. If it is determined that DN is equal to or smaller than T and DN<DNmin (Yes at step S412), the identifying unit 40B updates DNmin to the value of DN and substitutes j in Jmin (step S414). Jmin is a value that indicates the number of the first feature point 100 at the closest distance from the selected feature point. The identifying unit 40B sets a left adjacent feature point number of the feature point A[i] to Jmin, and thereafter the process flow proceeds to step S418 (step S416).

If it is determined that j is smaller than one or (v[i]−v[j]) is larger than the threshold T (No at step S406), if it is determined that (u[i]−u[j]) is equal to or larger than zero (No at step S408), and if it is determined that DN is equal to or larger than DNmin (No at step S412), j is decremented by one in order to determine whether the next feature point is adjacent to the selected feature point (step S418). It is determined whether j is equal to or larger than one (step S420). If it is determined that j is equal to or larger than one (Yes at step S420), the process returns to step S406 while if it is determined that j is smaller than one (No at step S420), the process flow proceeds to step S422.

When the left adjacent feature point of the selected feature point A[i] is identified at step S416, the identifying unit 40B increments i by one (step S422) and determines whether i reaches C, which is the maximum (step S424). If it is determined that i reaches C (Yes at step S424), the process ends. If it is determined that i does not reach C (No at step S424), the processing is repeated from step S404.

In the identification processes of an upper adjacent feature point illustrated in FIG. 20, only step S508 differs from the identification processes illustrated in FIG. 19. It is determined whether (u[i]−u[j]) is larger than zero (step S508). When the feature point A[j] is present on the upper side of a certain first feature point A[i], (u[i]−u[j]) is larger than zero. Thus, the first feature point 100 possibly located on the upper side is narrowed down by the process at step S508 when the upper adjacent point is identified. In the process described above, the searching starts from j=i−1 and proceeds to j=1. The searching ends when v[i]−u[j]>T, because it is consistently satisfied that v[i]−u[j]>T, i.e., DN>T, by j smaller than the j satisfying of v[i]−u[j]>T, thereby further reducing a load on the processing.

Figures 21, 22:
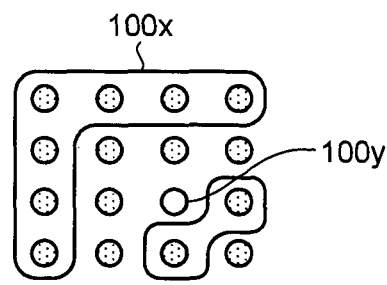
FIG. 21 is a schematic diagram illustrating a relation with identified adjacent feature points.
FIG. 22 is a schematic diagram illustrating an example of the feature points having no adjacent feature points.

The implementation of the processing makes it possible to prevent the occurrence of a problem in that the feature point is identified as both of the adjacent feature point on the left side and the adjacent feature point on the upper side. An upper adjacent feature point number and the left adjacent feature point number of A[i], which is a certain first feature point 100a identified by the technique described above, are identified for each target element as illustrated in FIG. 21. This correspondence relation is stored in a buffer of the storage unit 22. As illustrated in FIG. 22, a feature point group 100x is located on the periphery area in the grid array and a defective feature point in a photographed image is present on the upper or the left side of a feature point group 100y. The left (upper) adjacent feature point number corresponding to the feature point in such a feature point group is set to zero, which means that no "adjacent feature point" is present.

Figure 23:
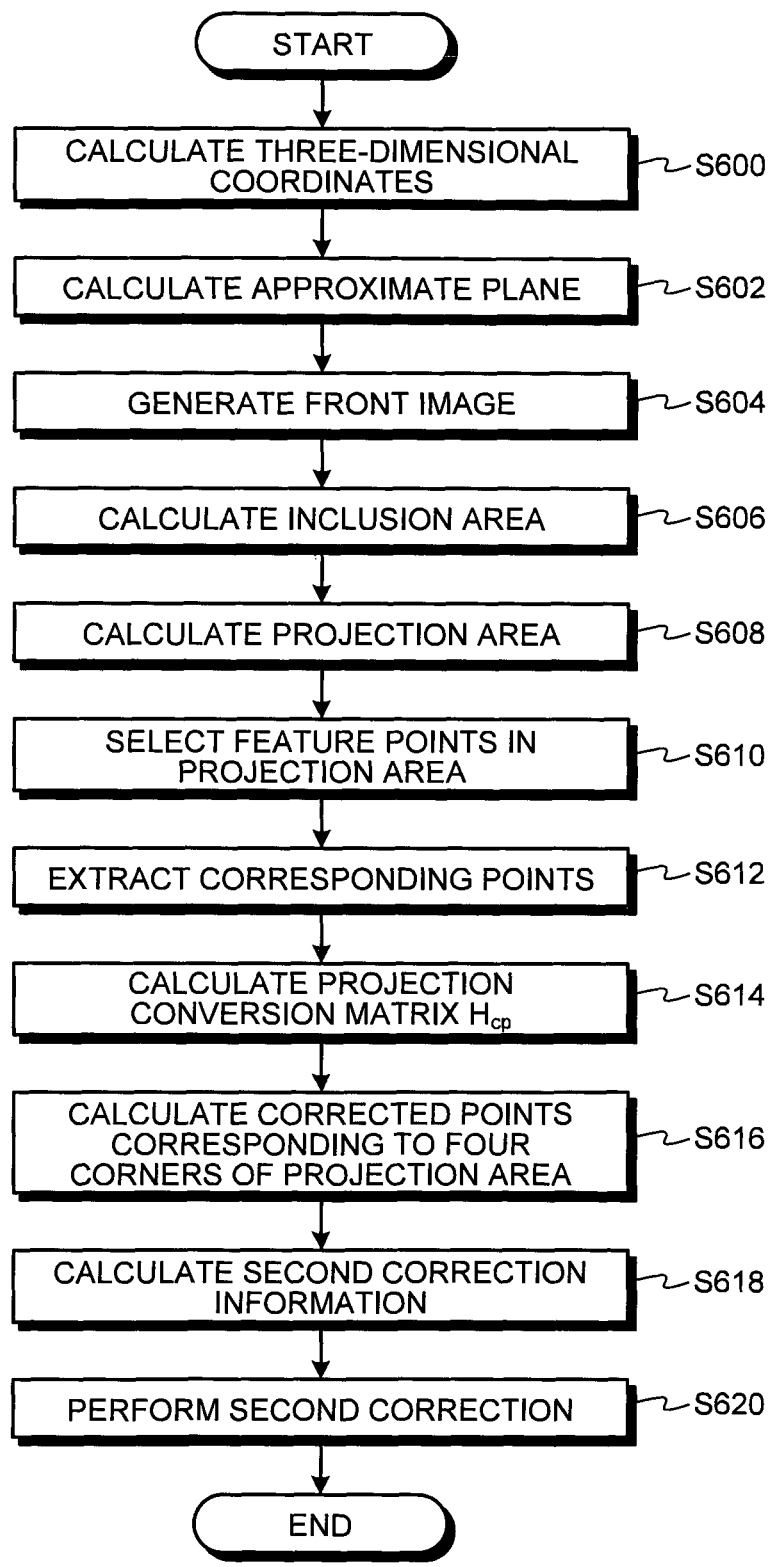
FIG. 23 is a flowchart illustrating a procedure of second correction.

The following describes a procedure of the second correction performed by the second correction unit 32. FIG. 23 is a flowchart illustrating the procedure of the second correction performed by the second correction unit 32.

The three-dimensional coordinates calculation unit 50 calculates the three-dimensional coordinates of the first feature points 100 in the first projection image, which is the image of the first pattern image 62A projected on the projection surface 12, using the first pattern image 62A and the first photographed image 62B (step S600).

The approximate plane calculation unit 52A performs an approximate plane calculation that calculates the approximate plane approximated to the plane including the projection surface 12 (step S602).

Figure 24:
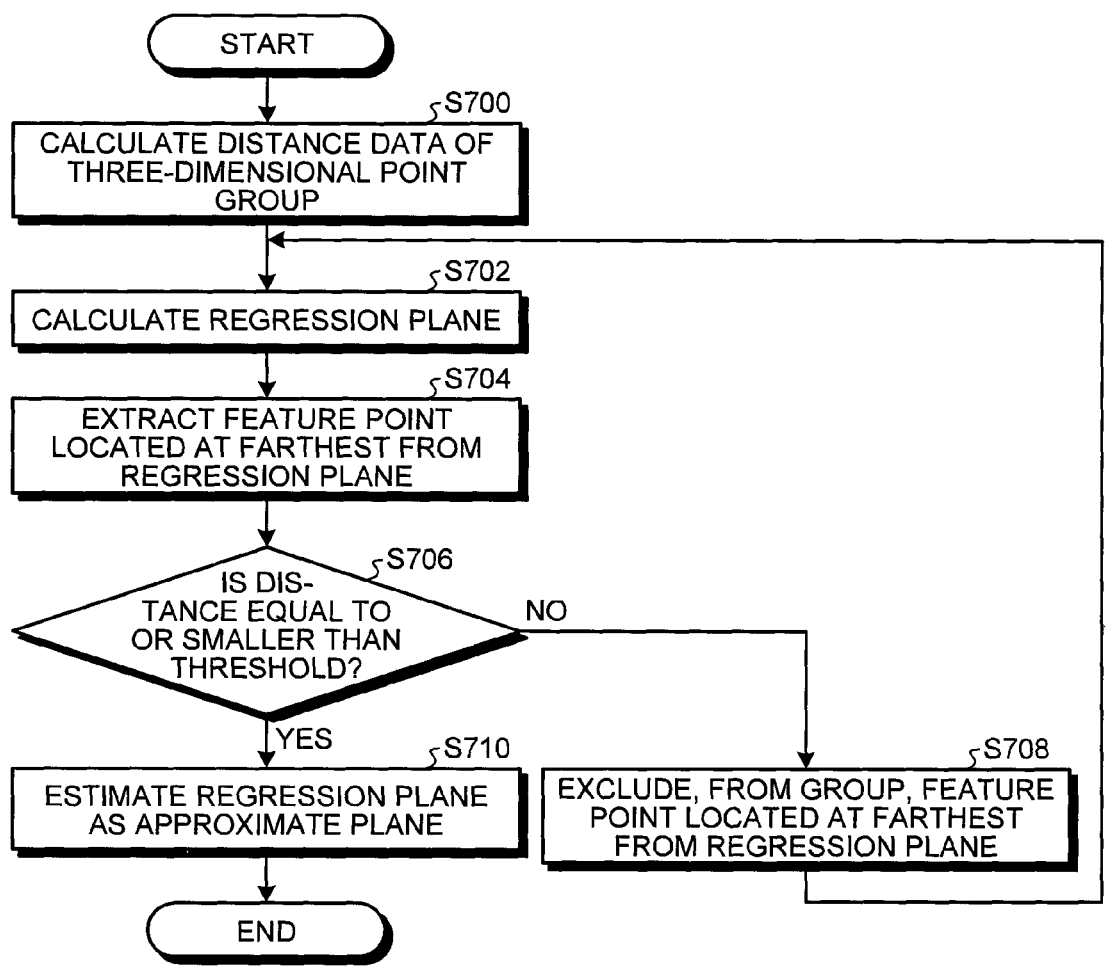
FIG. 24 is a flowchart illustrating a procedure of approximate plane calculation.

FIG. 24 is a flowchart illustrating a procedure of the approximate plane calculation performed by approximate plane calculation unit 52A.

The approximate plane calculation unit 52A calculates distance data of the first feature points 100 whose three-dimensional coordinates are calculated by the three-dimensional coordinates calculation unit 50 (hereinafter the first feature points 100 may be referred to as the three-dimensional point group) (step S700). The distance data can be calculated by reading the coordinates of the three-dimensional coordinates of the respective first feature points 100 in the direction directing from the projection apparatus 14 toward the projection surface 12.

The approximate plane calculation unit 52A calculates regression plane data as information about the plane corresponding to the projection surface 12 from the distance data of the respective first feature points 100 calculated at step S700 (step S702). The following specifically describes a calculation method of the regression plane data with reference to FIG. 25.

Part (A) in FIG. 25 illustrates a regression plane P1 after a regression analysis is performed. Part (B) in FIG. 25 illustrates a regression plane P2 after the feature point is excluded that is located at the farthest from the regression plane and estimated at step S708, which will be described later.

As illustrated in part (A) in FIG. 25, the three-dimensional coordinates of n feature points (XABi, YABi, and ZABi) (i=1 to n) are calculated by the three-dimensional coordinates calculation unit 50 as the first feature points 100, for example. They are illustrated in part (A) in FIG. 25 as circles, triangles, and x-shaped marks.

The approximate plane calculation unit 52A defines an equation of the regression plane as z=ax+by+c in order to calculate the regression plane from the first feature points 100 by regression analysis. The relation between the regression plane and the three-dimensional point group is represented by the following expression (10).

$$Z = X\beta + \epsilon \tag{10}$$

The respective variables in expression (10) are represented by the following expression (11).

$$Z = \begin{pmatrix} Z_{AB1} \\ Z_{AB2} \\ \vdots \\ Z_{ABn} \end{pmatrix}, \begin{pmatrix} x_{AB1} & y_{AB1} & 1 \\ x_{AB2} & y_{AB2} & 1 \\ & \vdots & \\ x_{ABn} & y_{ABn} & 1 \end{pmatrix}, \beta = \begin{pmatrix} a \\ b \\ c \end{pmatrix}, \epsilon = \begin{pmatrix} e_1 \\ e_2 \\ \vdots \\ e_n \end{pmatrix} \tag{11}$$

In expression (11), ei is the residual error.
The normal equation is represented by expression (12).

$$X^T Z = (X^T X)\beta \tag{12}$$

Therefore, β is represented by the following expression (13).

$$\beta = (X^T X)^{-1} X^T Z \tag{13}$$

The approximate plane calculation unit 52A calculates constants (parameters) a, b, and c such that the square sum of the residual error ei becomes the minimum using a least-square technique, for example, thereby obtaining the regression planes (P1 and P2 in FIG. 25). The approximate plane calculation unit 52A acquires the constants a, b, and c of the equation of the regression plane (z=ax+by+c) as the regression plane data.

Referring back to FIG. 24, the process flow proceeds to step S704 after the completion of the acquisition of the regression plane data. At step S704, the approximate plane calculation unit 52A calculates a distance DABi between the calculated regression plane and the three-dimensional point group, and extracts a corresponding point PMAX (XABD, YABD, ZABD) located at the farthest from the regression plane in the three-dimensional point group and the distance DMAX (PMAX is illustrated in part (A) in FIG. 25). Specifically, the approximate plane calculation unit 52A calculates the distance from the feature point (XABi, YABi, ZABi) to the plane (αx+βy+γz+δ=0) using the following expression (14).

$$D_{ABi} = \frac{|\alpha x_{ABi} + \beta y_{ABi} + \gamma z_{ABi} + \delta|}{\sqrt{\alpha^2 + \beta^2 + \gamma^2}} \tag{14}$$

The approximate plane calculation unit 52A calculates the distances between the regression plane and all of the points of the three-dimensional point group, and selects the first feature point 100, whose absolute value of the distance is the maximum. As a result, the approximate plane calculation unit 52A extracts the feature point PMAX (XABD, YABD, ZABD) that is located at the farthest from the calculated regression plane (step S704).

The approximate plane calculation unit 52A determines whether the distance DMAX of the feature point PMAX (XABD, YABD, ZABD) is equal to or smaller than a predetermined threshold (step S706). If a negative determination is made at step S706 (No at step S706), the process flow proceeds to step S708.

The threshold is a value corresponding to the distance between the projection surface 12 and the projection apparatus 14. The threshold may be preliminarily measured and stored in the storage unit 22. The threshold may be a value corresponding to a depth of field of the image processing system 10.

At step S708, the approximate plane calculation unit 52A excludes the feature point PMAX (XABD, YABD, ZABD) from the group of the first feature points 100 located on the regression plane (step S708), and then the process returns to step S702.

If a positive determination is made at step S706 (Yes at step S706), the process flow proceeds to step S710. At step S710, the approximate plane calculation unit 52A estimates the regression plane calculated at step S702 as the approximate plane corresponding to the projection surface 12, and then this routine ends.

Through the processes from step S700 to step S710, the approximate plane calculation unit 52A estimates the approximate plane corresponding to the projection surface 12. The approximate plane calculation unit 52A calculates the approximate plane by excluding the feature point whose distance from the regression plane exceeds the threshold, thereby making it possible to calculate the approximate plane with high accuracy even when an obstacle is present between the image processing system 10 and the projection surface 12.

Referring back to FIG. 23, the front image generation unit 52B produces the front image (step S604).

The front image is the image when it is assumed that the approximate plane calculated by the approximate plane calculation unit 52A is photographed from the normal line direction of the approximate plane.

Figure 26:
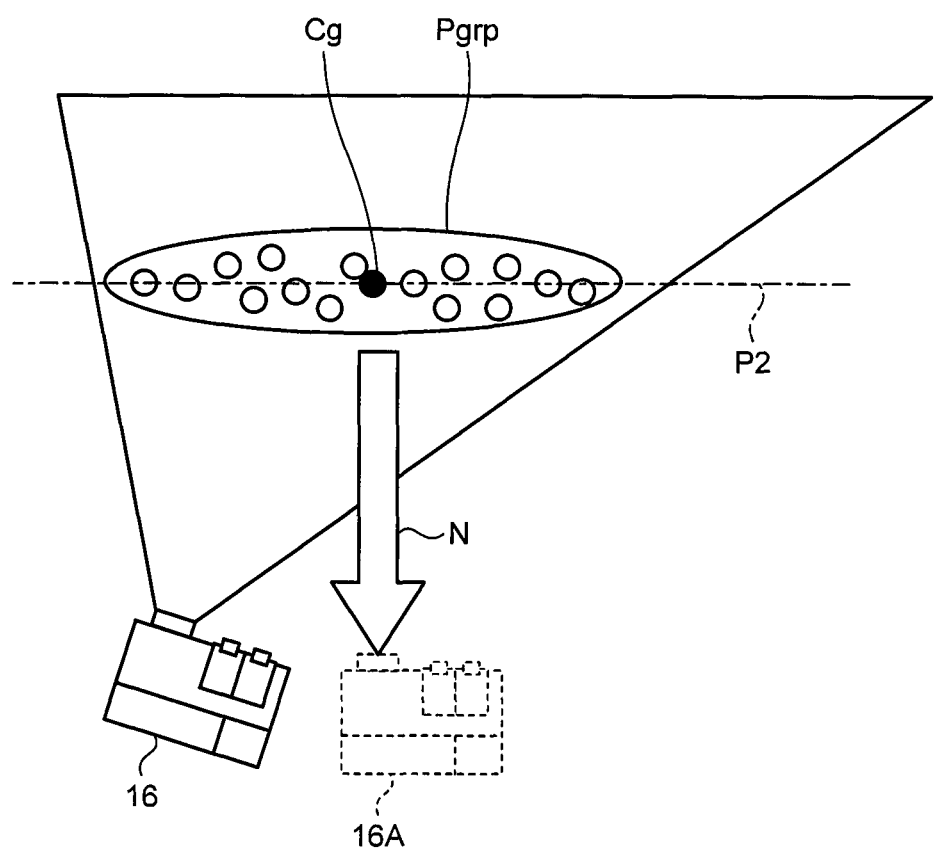
FIG. 26 is an explanatory view of generation of a front image.

FIG. 26 is an explanatory view of the generation of the front image. FIG. 26 indicates the assumption that a virtual camera (e.g., a projector including a photographing unit) 16A is disposed on the line extending in a normal direction N of the approximate plane from a center position (gravity center) Cg of a group Pgrp of the first feature points 100 on the approximate plane.

As illustrated in FIG. 26, the photographing apparatus 16, which is the actual camera, takes the photographed images such as the first photographed image and the second photographed image in the image processing system 10.

The front image generation unit 52B calculates the front image that is obtained when the approximate plane P2 is photographed by the virtual camera 16A disposed on the extension of the line in the normal direction N of the approximate plane P2. Specifically, the front image generation unit 52B projects the three-dimensional point group Pgrp on a two-dimensional plane corresponding to the photographed image taken by the virtual camera 16A using the perspective projection transformation matrix P described above, thereby calculating the front image.

Referring back to FIG. 23, the projection area generation unit 53C calculates an inclusion area (step S606). The inclusion area is the area that includes the first feature points 100 (three-dimensional point group) on the approximate plane out of the three-dimensional point group.

FIG. 27 is an explanatory view of the inclusion area calculation. Part (A) in FIG. 27 is the explanatory view of the three-dimensional point group Pgrp (first feature points 100) in the front image. Part (B) in FIG. 27 is the explanatory view of the inclusion area and the projection area, which will be described later.

In part (A) in FIG. 27, the projection area generation unit 53C extracts the feature points on the approximate plane (refer to the circles in FIG. 27 and the three-dimensional point group Pgrp in FIG. 26) in the front image on the basis of the distance data calculated from the three-dimensional coordinates of the respective first feature points 100. The projection area generation unit 53C calculates an inclusion area that includes all of the extracted feature points (refer to the circles in FIG. 27) in part (B) in FIG. 27. As illustrated in part (B) in FIG. 27, the inclusion area is an inclusion area C1 that includes the circles in part (B) in FIG. 27.

Referring back to FIG. 23, the projection area generation unit 53C calculates the projection area (step S608). The projection area is a rectangular area that includes the maximum number of first feature points 100 (the circles in FIG. 27) included in the inclusion area C1 calculated at step S606 (refer to a projection area C2 in FIG. 27). The shape and the aspect ratio of the projection area C2 is the same as the aspect ratio of the projection target image, for example. Specifically, when a projection target image having 1600× 1200 pixels is projected, the aspect ratio of the projection area is four to three.

The second calculation unit 54 selects the first feature points 100 (refer to $M_{V1}$ to $M_{V4}$ in part (B) in FIG. 27) located in the projection area C2 calculated at step S608 (step S610). For example, the second calculation unit 54 selects four points at four corners of the front image as the first feature points 100 located in the projection area C2 calculated at step S608.

The second calculation unit 54 extracts the corresponding points that correspond to the first feature points 100 (refer to MV1 to MV4 in part (B) in FIG. 27) selected at step S610 in the projection target image corrected by the first correction unit 30 (step S612). The extraction of the corresponding points may be performed in the same manner as the distance data calculation described above.

The second calculation unit 54 calculates the projection transformation matrix Hcp (step S614). The second calculation unit 54 calculates the projection transformation matrix Hcp using the four corresponding points, which correspond to the feature points on the front image, on the projection target image.

The second calculation unit 54 calculates four corrected points that correspond to the four corners of the projection area C2 calculated at step S608 on the projection target image (step S616).

The following specifically describes a calculation method of the corrected points with reference to FIG. 28. FIG. 28 is an explanatory view of a relation between the front image and the projection target image. Part (A) in FIG. 28 is an explanatory view of the four corner points of the projection area C2 on the front image. Part (B) in FIG. 28 is an explanatory view of the four corrected points on the projection target image.

As illustrated in part (A) in FIG. 28, the second calculation unit 54 extracts the four corner points (URv, ULv, DRv, and DLv in FIG. 28) of the projection area C2 calculated at step S608 by the process at step S612. As illustrated in part (B) in FIG. 28, the second calculation unit 54 calculates the four corrected points (URva, ULva, DRva, and DLva in FIG. 28) corresponding to the four corner points on the projection target image using the projection transformation matrix Hcp (step S614 to step S616).

Referring back to FIG. 23, the second correction unit 56 calculates the second correction information (step S618).

The second correction unit 56 calculates a correction transformation matrix Hpp for deforming (correcting) the four corner points (e.g., URa in part (B) in FIG. 28) of the projection target image to the four corrected points (e.g., URva) calculated at step S616. The calculation method of the correction transformation matrix Hpp is the same as that described at step S614 and thus the description thereof is omitted.

After the completion of the calculation of the correction transformation matrix Hpp, the correction transformation matrix Hpp is stored in the storage unit 22 as the second correction information. The second correction unit 56 further corrects the projection target image corrected by the first correction unit 30 using the second correction information (step S620), which ends this routine.

As described above, in the image processing system 10 of the embodiment, the projection control unit 24 performs control such that the first pattern image 62A in which the plurality of first feature points 100 are arranged in a grid and the second pattern image 60A that is a part of the first pattern image 62A and includes the plurality of second feature points 200 are projected on the projection surface 12. The acquisition unit 28 acquires, from the photographing unit 16A, the first photographed image 62B of the projected first pattern image 62A and the second photographed image 60B of the second pattern image 60A projected on the planar projection surface. The extraction unit 40 extracts the second connected elements L2 in which the second feature points 200 in the second photographed image 60B are connected in a predetermined direction, and the first connected elements L1 in which, in the first photographed image 62B, the first feature points 100 at positions corresponding to the second feature points 200 included in the second connected elements L2 are connected. The shift amount calculation unit 42 calculates the shift amounts of the first connected elements L1 with respect to the second connected elements L2. The first calculation unit 46 calculates the first correction information for correcting the projection target image on the basis of the shift amounts.

In this way, the image processing system 10 of the embodiment calculates the first correction information using the first pattern image 62A and the second pattern image 60A.

As a result, the image processing system 10 of the embodiment prevents the accuracy of the calculated correction information from being lowered due to the influence of disturbance such as an environmental change including a change in ambient light. Consequently, the image processing system 10 of the embodiment can provide the correction information capable of correcting the distortion of the projection image with high accuracy.

Furthermore, the second correction performed in addition to the first correction makes it possible to provide even more accurate correction information.

In the embodiment, the patterns illustrated in FIG. 2 are used as the first pattern image 62A and the second pattern image 60A. The pattern images are not limited to those illustrated in FIG. 2. Any pattern images may be applicable in which the feature points are arranged in a grid.

Figure 29:
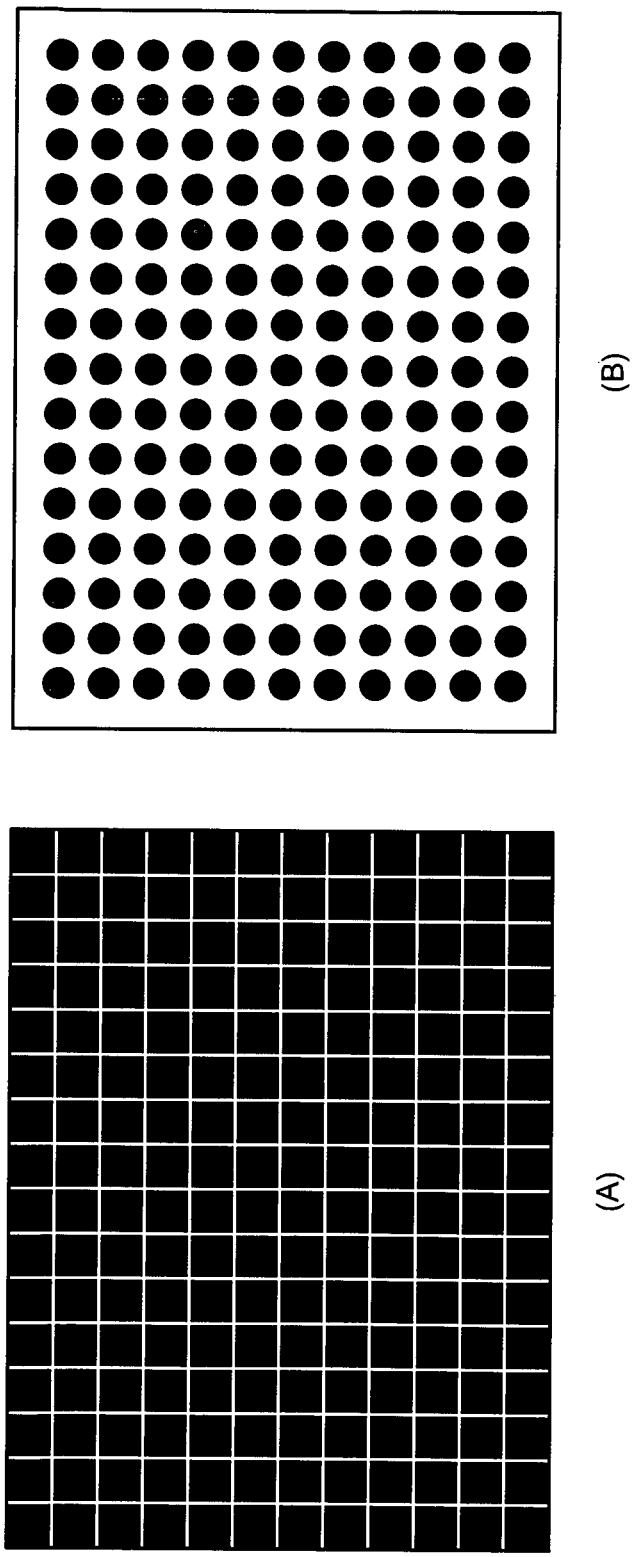
FIG. 29 is a schematic diagram illustrating other examples of the first pattern image.

FIG. 29 is a schematic diagram illustrating other examples of the first pattern image 62A. As illustrated in part (A) in FIG. 29, the first pattern image 62A may be an image in which a white grid pattern is disposed on a black background image. As illustrated in part (B) in FIG. 29, the first pattern image 62A may be an image in which black point-like images are arranged in a grid on a white background image. The second pattern image 60A may be an image that is a part of one of the first pattern images 62A described above and includes the plurality of feature points. When the grid pattern illustrated in part (A) in FIG. 29 is used and it is assumed that no disturbance is present due to environmental light and the like, the position coordinates of the feature points can be extracted from this pattern, thereby making it possible to provide more accurate correction information. When the group of the point-like images illustrated in part (B) in FIG. 29 is used, the group hardly undergoes influence of the disturbance due to environmental light by detecting the gravity centers of the respective point-like images, thereby making it possible to extract accurate position coordinates. As a result, more accurate correction information can be provided.

Modification Example 1

In the embodiment, the image processing apparatus 18 uses the photographed images (the first photographed image 62B and the second photographed image 60B) of the two pattern images (the first pattern image 62A and the second pattern image 60A). The image processing apparatus 18, however, may calculate the first correction information using the photographed image of a single pattern image.

Figure 30:
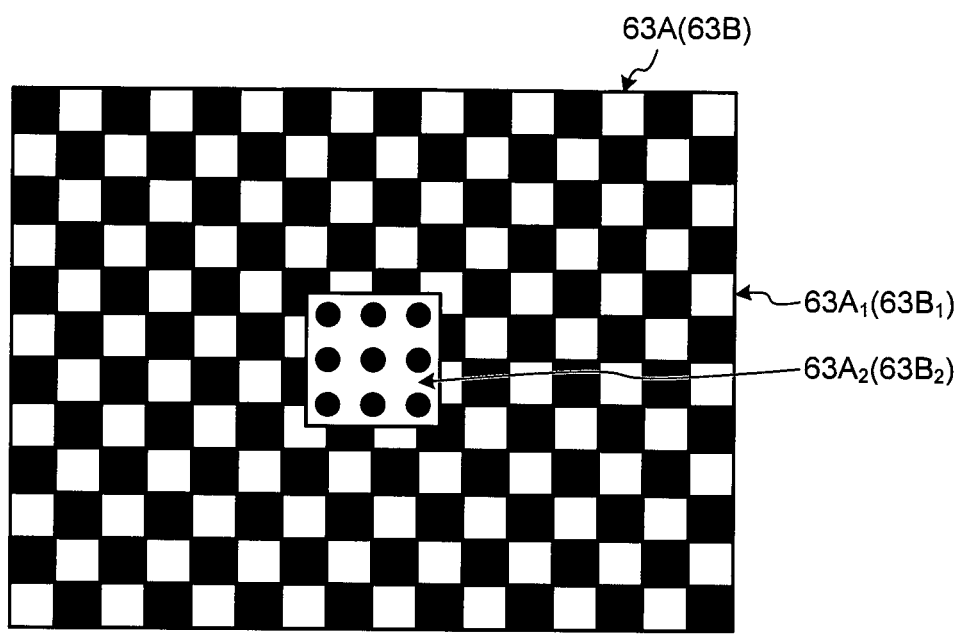
FIG. 30 is a schematic diagram illustrating an example of a third pattern image.

In this case, a third pattern image may be used. FIG. 30 is a schematic diagram illustrating an example of a third pattern image 63A. The third pattern image 63A includes a first pattern image 63A1 and a second pattern image 63A2 disposed on the first pattern image 63A1.

In the example illustrated in FIG. 30, the first pattern image 63A1 is an image in which white square areas and black square areas are alternately arranged in a grid. The first feature points in the first pattern image 63A1 are the points at which vertexes of the white square areas and the vertexes of the black square areas meet.

In the example illustrated in FIG. 30, the second pattern image 63A2 is disposed at the center of the first pattern image 63A1 and in which black circular dots (black point-like images) are arranged in a grid. The second feature points in the second pattern image 63A2 are the black circular dots.

In this case, the image processing apparatus 18 preliminarily stores the third pattern image 63A in the storage unit 22. The projection control unit 24 reads the third pattern image 63A stored in the storage unit 22 and controls the projection unit 14A such that the projection unit 14A projects the third pattern image 63A on the projection surface 12. A third photographed image 63B of the third pattern image 63A is taken under the control of the photographing control unit 26.

The first correction unit 30 performs the first correction. The first correction unit 30 extracts the area corresponding to the second pattern image 63A2 in the third photographed image 63B as a second photographed image 63B2. The first correction unit 30 extracts the area corresponding to the first pattern image 63A1 in the third photographed image 63B as a first photographed image 63B1. The first correction unit 30 performs the first correction using the first photographed image 63B1 and the second photographed image 63B2 in the same processing manner as the embodiment described above. The second correction unit 32 performs the same processing as the embodiment using the first photographed image 63B1 and the second photographed image 63B2 that are extracted by the first correction unit 30.

In this way, the use of the third pattern image 63A, in which the second pattern image 63A2 is disposed on the first pattern image 63A1, makes it possible to capture the two photographed images (the first photographed image 63B1 and the second photographed image 63B2) at one photographing. As a result, high-speed and simple processing can be achieved in addition to the affects of the embodiment.

Modification Example 2

In the embodiment, the second pattern image 60A corresponds to the image at the center of the first pattern image 62A (refer to FIG. 2). The second pattern image 60A, however, is not limited to the image at the center of the first pattern image 62A, and may be the image of any area in the first pattern image 62A.

Figure 31:
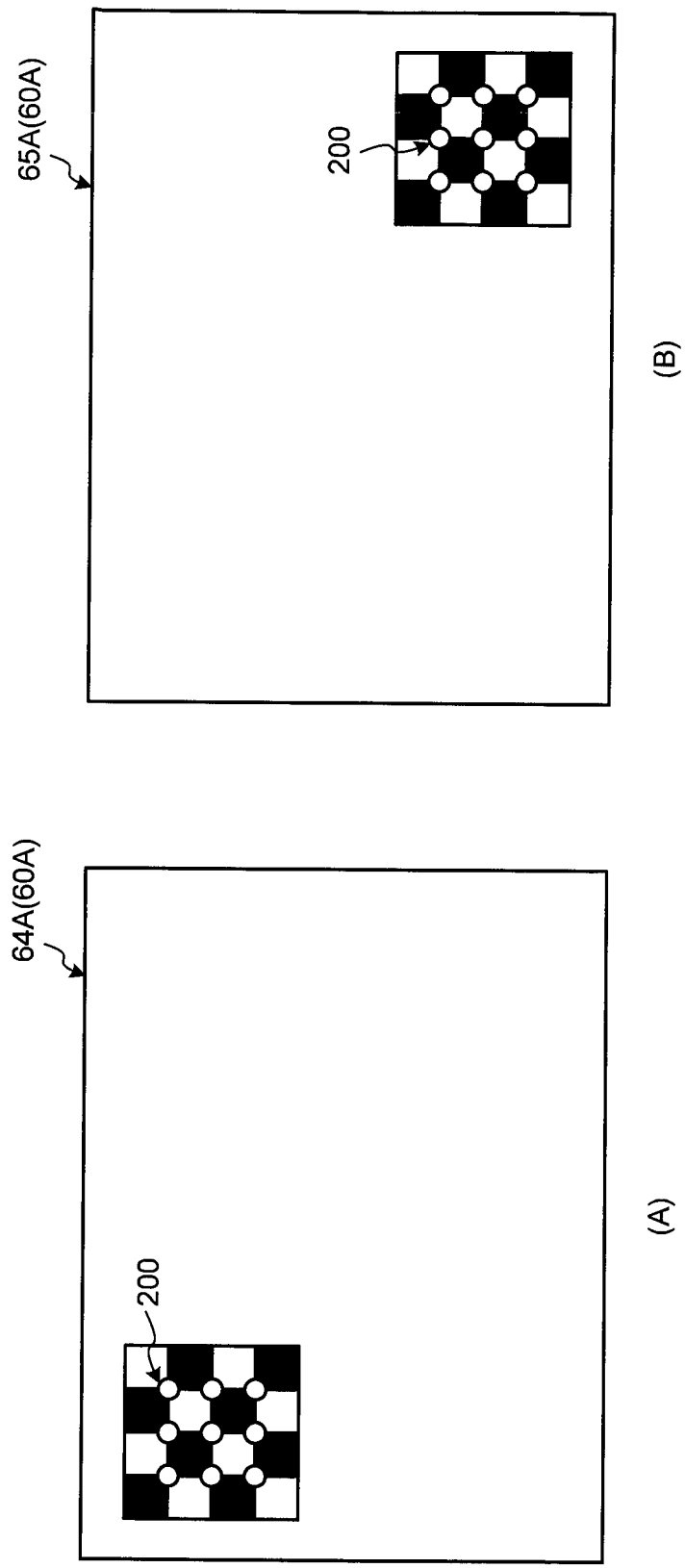
FIG. 31 is a schematic diagram illustrating other examples of the second pattern image.

FIG. 31 is a schematic diagram illustrating other examples of the second pattern image 60A. Part (A) in FIG. 31 is a schematic diagram illustrating a case where the second pattern image 60A is the image (a second pattern image 64A) of an area corresponding to the area on the upper left in the first pattern image 62A illustrated in part (A) in FIG. 2. Part (B) in FIG. 31 is a schematic diagram illustrating a case where the second pattern image 60A is the image (a second pattern image 65A) of an area corresponding to the area on the lower right in the first pattern image 62A illustrated in part (A) in FIG. 2. The second pattern images 64A and 65A include the plurality of second feature points 200 as described in the embodiment.

Depending on the positional relation between the projection apparatus 14 and the projection surface 12, the center area of the projection image is not disposed on the projection surface 12 in some cases. Assuming such a case, the processing is preferably performed on the assumption that any area (area is not limited to the center area) of the projection image is disposed on the projection surface 12. In this modification example, the image processing apparatus 18 includes a display unit and an operation unit, for example. The display unit is a known display device. The operation unit is operated by a user when the user performs various instructions, and is a keyboard or a mouse, for example.

The image processing apparatus 18 displays, on the display unit, information that induces a user to set an area such that the area is probably disposed on the projection surface 12 as the projection image. For example, the image processing apparatus 18 displays, on the display unit, the first pattern image 62A illustrated in part (A) in FIG. 2 and information that induces a user to specify the area for the second pattern image. The user may specify any area in the first pattern image 62A as the second pattern image 60A while operating the operation unit (e.g., refer to FIG. 31). The image processing apparatus 18 then performs the same processing as the embodiment.

As a result, this modification example makes it possible to perform the calculation of the first correction information in accordance with the setting condition of the projection surface 12 and the image processing system 10 in addition to the effects of the embodiment.

Modification Example 3

In the embodiment, the first pattern image and the second pattern image have the plurality of feature points (the first feature points and the second feature points) arranged in a grid. As described above, the first pattern image and the second pattern image are not limited to have the plurality of feature points (the first feature points and the second feature points) arranged in a grid.

The first pattern image 62A and the second pattern image 60A are not limited to have the feature points arranged in a grid as long as the arrangements of the feature points (the first feature points 100 and the second feature points 200) are preliminarily stored in the storage unit 22 of the image processing system 10 and the positional relation between the feature points (the first feature points 100 and the second feature points 200) is clear. To clarify the positional relation between the feature points, an arrangement rule may be preliminarily set, such as the respective feature points are not overlapped with one another or the distance between the feature points is equal to or smaller than a threshold, and the respective feature points may be arranged under the arrangement rule.

Figure 32:
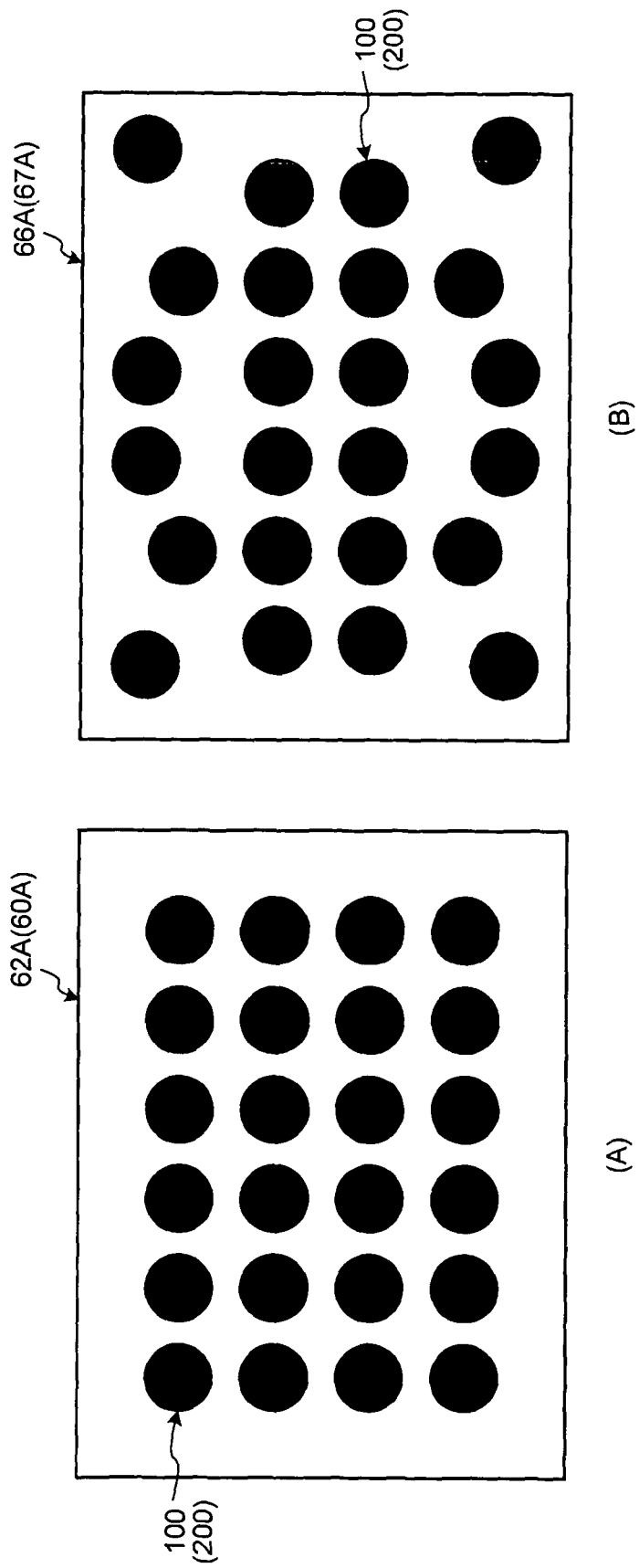
FIG. 32 is a schematic diagram illustrating an example of the first pattern image and the second pattern image.

FIG. 32 is a schematic diagram illustrating an example of the first pattern image and the second pattern image. Part (A) in FIG. 32 is a schematic diagram of the first pattern image 62A and the second pattern image 60A in which the feature points (the first feature points 100 and the second feature points 200) are arranged in a grid, which are described in the embodiment.

Part (B) in FIG. 32 is a schematic diagram illustrating an example of a form in which the feature points (the first feature points 100 and the second feature points 200) are not arranged in a grid. A first pattern image 66A and a second pattern image 67A may be applicable in which the feature points (the first feature points 100 and the second feature points 200) are not arranged in a grid, but are arranged under the arrangement rule as illustrated in part (B) in FIG. 32.

Modification Example 4

In the embodiment, the second correction unit 32 corrects the projection target image such that the projection image is projected on the projection surface 12 on the assumption that the projection surface 12 is a large plane.

The second correction unit 32, however, may correct the projection target image such that the projection image is projected on a specified area (e.g., an uneven area such as a depressed area of a wall) specified by a user.

Figure 33:
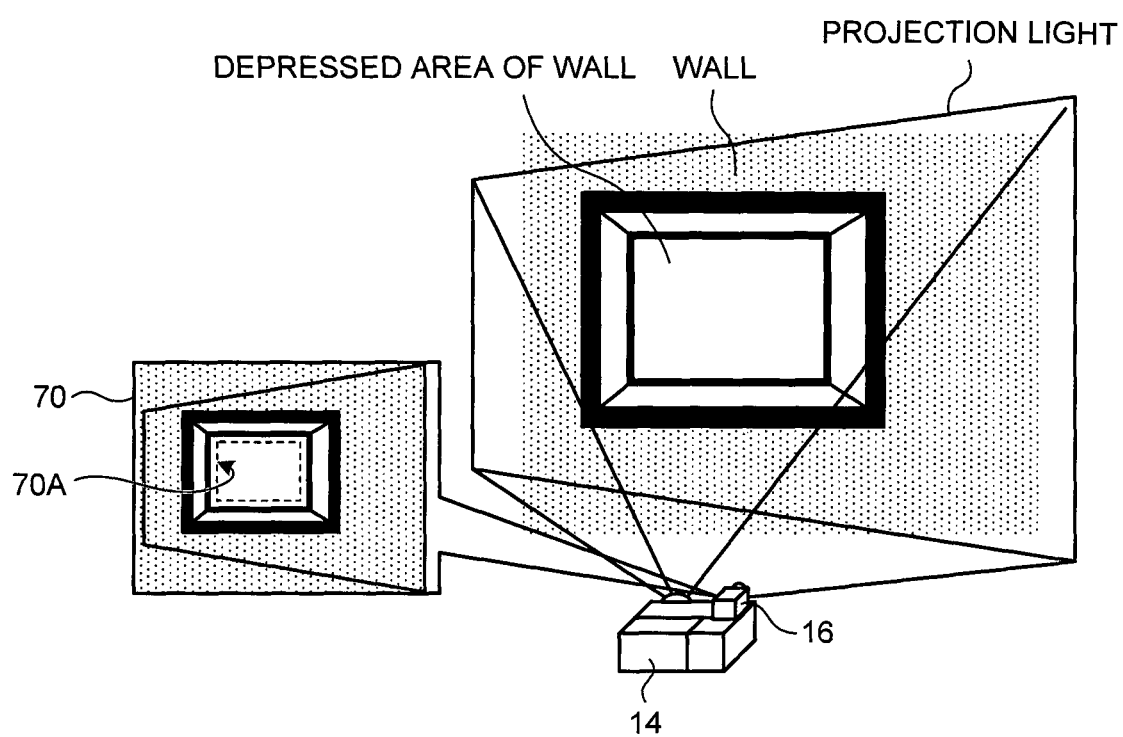
FIG. 33 is an explanatory view of a modification example.

FIG. 33 is an explanatory view of this modification example. In this case, the second correction unit 32 displays, on a display unit (illustration omitted), a photographed image 70 taken by the photographing apparatus 16. A user specifies an area to be corrected in the displayed photographed image 70 by operating an operation unit (illustration omitted). For example, a rectangular area 70A is specified in the photographed image 70. In this case, the second correction unit 32 may use the rectangular area 70A specified by the user as the projection surface 12 and correct the projection target image such that the projection image is projected on the projection surface 12.

Modification Example 5

In the embodiment, the image processing system 10 includes the image processing apparatus 18, the projection apparatus 14, and the photographing apparatus 16 as illustrated in FIG. 1. The image processing apparatus 18, the projection apparatus 14, and the photographing apparatus 16 may be separately provided.

Figure 34:
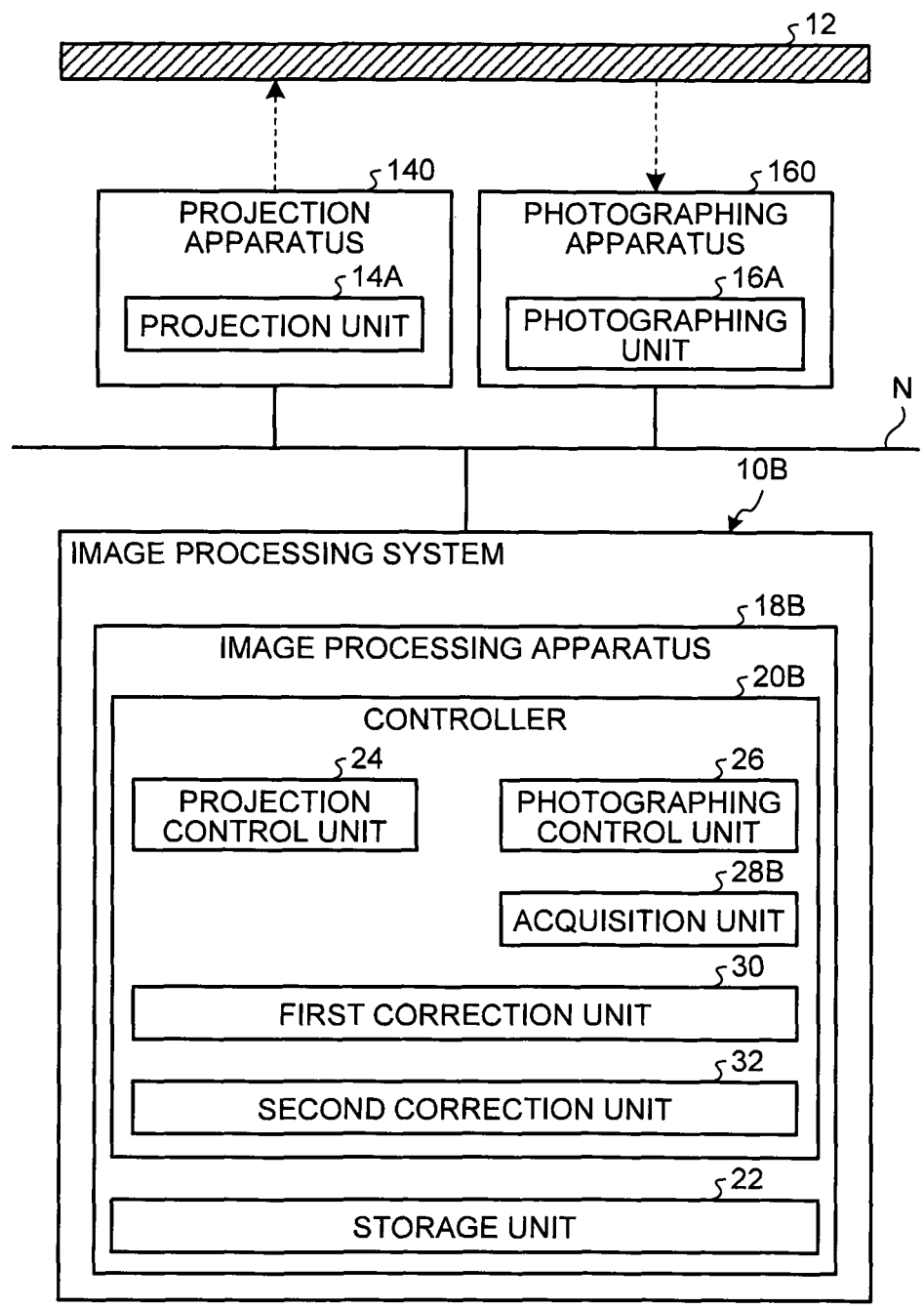
FIG. 34 is a schematic diagram illustrating another example of the structure of the information processing system.

FIG. 34 is a schematic diagram illustrating another example of the structure of the image processing system 10. As illustrated in FIG. 34, an image processing system 10B, a projection apparatus 140, and a photographing apparatus 160 may be coupled through a communication line N such as a network. The projection apparatus 140 may include the projection unit 14A while the photographing apparatus 160 may include the photographing unit 16A. The image processing system 10B may include an image processing apparatus 18B corresponding to the image processing apparatus 18. The image processing apparatus 18B may include a controller 20B corresponding to the controller 20. The controller 20B may include an acquisition unit 28B instead of the acquisition unit 28. The acquisition unit 28B may acquire a photographed image from the photographing apparatus 160 through the communication line N.

Modification Example 6

Part of the processing performed by the image processing system 10 in the embodiment may be performed by an apparatus or apparatuses included in a cloud computing system coupled with the image processing system 10 through a network, for example.

Figure 35:
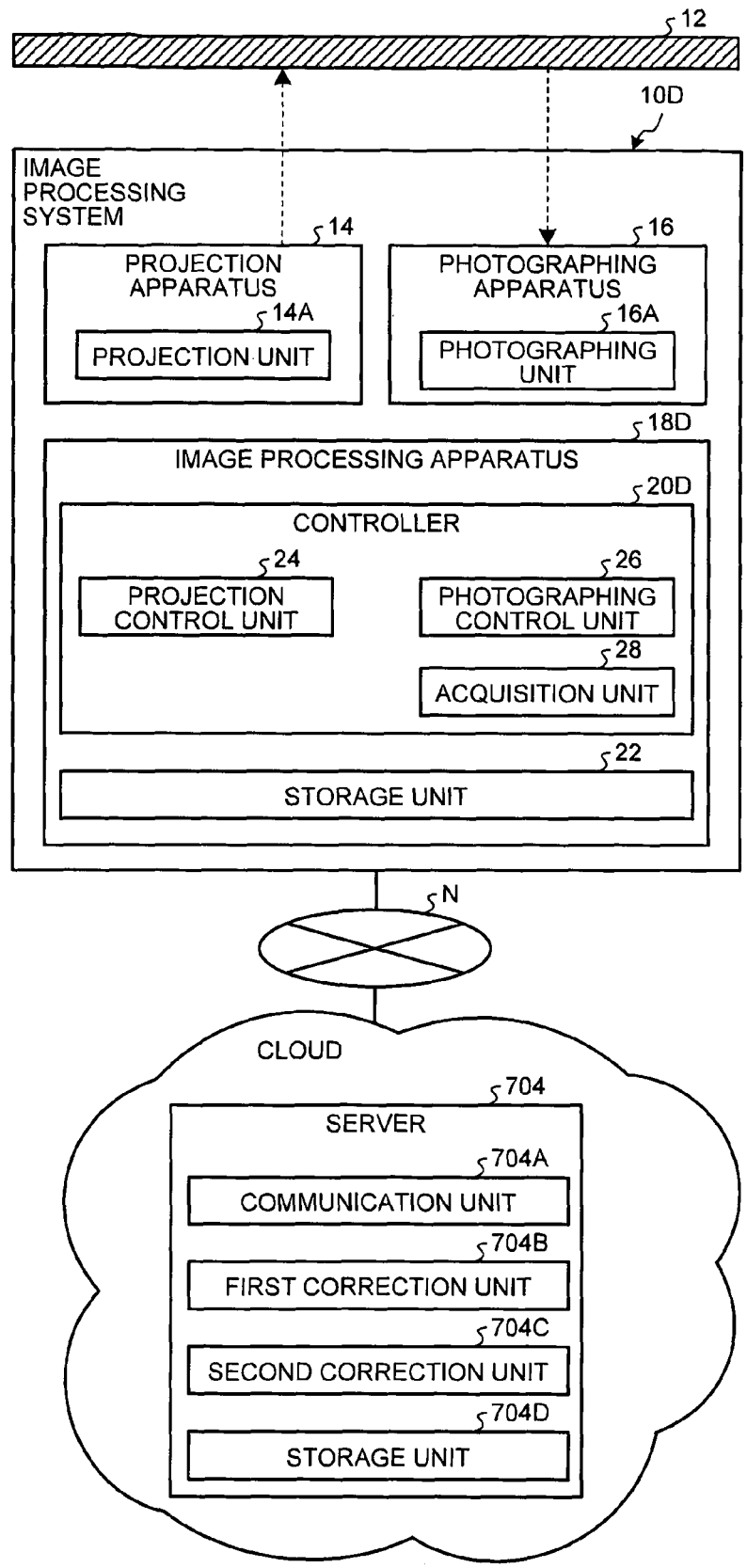
FIG. 35 is a schematic diagram illustrating an example of the image processing system provided with a cloud computing system.

FIG. 35 is a schematic diagram illustrating an example of the image processing system provided with a cloud computing system. As illustrated in FIG. 35, an image processing system 10D and a server 704 may be coupled through a network.

The image processing system 10D includes the projection apparatus 14, the photographing apparatus 16, and an image processing apparatus 18D. The image processing apparatus 18D includes a controller 20D instead of the controller 20. The controller 20D has the same structure as the controller 20 except that the first correction unit 30 and the second correction unit 32 are not included.

The server 704, which is provided in the cloud computing system, includes a communication unit 704A, a first correction unit 704B corresponding to the first correction unit 30, a second correction unit 704C corresponding to the second correction unit 32, and a storage unit 704D.

The controller 20D transmits the first photographed image 62B and the second photographed image 60B to the server 704 through the network N. In the server 704, the first photographed image 62B and the second photographed image 60B may be received through the communication unit 704A. The first correction unit 704B and the second correction unit 704C may perform the correction. Thereafter, the first correction information and the second correction information, or the corrected projection target image may be transmitted to the image processing system 10D.

The image processing systems 10, 10B, and 10D each have a hardware configuration using a typical computer and include a controller such as a CPU, a storage device such as a ROM or a RAM, an external storage device such as an HDD or a CD drive, and an input device such as a keyboard or a mouse.

A computer program for achieving the processing performed by the respective image processing systems 10, 10B, and 10D is embedded and provided in an NV-RAM, a ROM or another non-volatile storage medium. The program for achieving the processing performed by the respective image processing systems 10, 10B, and 10D can be recorded and provided in a computer-readable recording medium such as a CD-ROM, a flexible disk (FD), a CD-R, or a DVD (digital versatile disc) as an installable or executable file.

The program for achieving the processing performed by the respective image processing systems 10, 10B, and 10D may be stored in a computer connected to a network such as the Internet and provided or distributed by being downloaded through the network.

The program for achieving the processing performed by the respective image processing systems 10, 10B, and 10D may be embedded and provided in a ROM, for example.

The program for achieving the processing performed by the respective image processing systems 10, 10B, and 10D has a module structure including the respective units described above. In actual hardware, the CPU (processor) reads the program from the storage medium and executes the program. Once the program is executed, the respective units are loaded into a main storage, so that the respective units are formed in the main storage.

Figure 36:
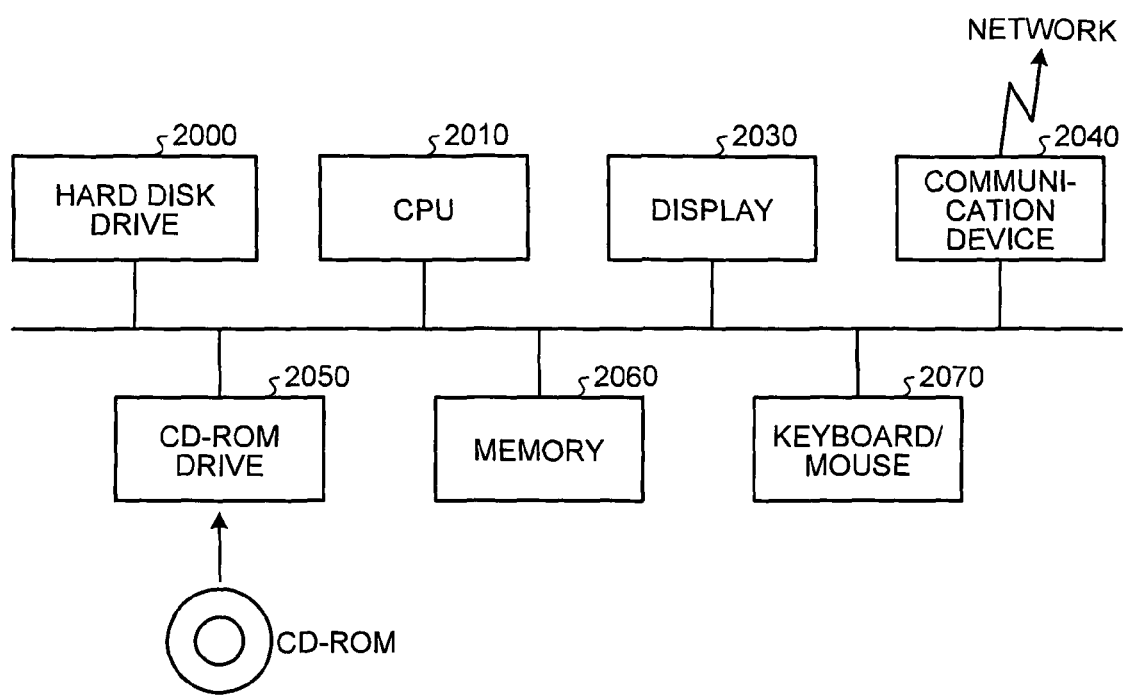
FIG. 36 is a hardware structural diagram illustrating a structure of a computer.

The program for achieving the processing performed by the respective image processing systems 10, 10B, and 10D can be executed by a computer program running on a computer. FIG. 36 is a hardware structural diagram illustrating a structure of a typical computer. The computer includes a CPU 2010, a hard disk drive 2000, a display 2030, a communication device 2040, a CD-ROM drive 2050, a memory 2060, and a keyboard/mouse 2070. For example, the program for implementing the processing recorded in a recording medium such as a CD-ROM may be read through the CD-ROM drive 2050. The read program may be loaded into the memory 2060 when being executed and then processing steps of the program may be sequentially executed by the commands from the CPU 2010. Various images used for the processing are preliminarily stored in the hard disk drive 2000 or taking by the photographing apparatus 16 (illustration omitted in FIG. 36) when the processing is performed, and thereafter loaded in the memory 2060 for being used.

The present invention is not limited to the embodiment described above. The embodiment can be modified without departing from the spirit of the present invention.

The present invention can provide an advantage of providing correction information capable of correcting the distortion of the projection image with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

10 image processing system
14A projection unit
16A photographing unit
18 image processing apparatus
24 projection control unit
26 photographing control unit
28 acquisition unit
30 first correction unit
32 second correction unit
38 transformation unit
40 extraction unit
40A coordinate transformation unit
40B identifying unit
40C connected component generation unit
42 shift amount calculation unit
46 first calculation unit
48 first correction processing unit
50 three-dimensional coordinates calculation unit
52A approximate plane calculation unit
52B front image generation unit
53C projection area generation unit
54 second calculation unit
56 second correction processing unit

The invention claimed is:

1. An image processing apparatus, comprising:
   projection control circuitry to perform control such that
      a first pattern image in which a plurality of first feature points are arranged is caused to be projected on a projection surface, and
      a second pattern image including a plurality of second feature points corresponding to the first feature points is caused to be projected on a planar projection surface;
   acquisition circuitry to acquire, from a camera, a first photographed image of the projected first pattern image projected on the projection surface and a second photographed image of the second pattern image projected on the planar projection surface;

extraction circuitry to extract second connected components in which the second feature points in the second photographed image are connected in a predetermined direction and first connected components in which the first feature points in the first photographed image at positions corresponding to the second feature points included in the second connected components are connected;

shift amount calculation circuitry to calculate shift amounts of the first connected components with respect to the second connected components;

first calculation circuitry to calculate first correction information for correcting a projection target image on the basis of the shift amounts; and transformation circuitry to perform coordinate transformation on second coordinates information of the second feature points on the second photographed image into first coordinates information on the first photographed image, wherein the extraction circuitry extracts the second connected components in which the coordinate-transformed second feature points in the second photographed image are connected in a predetermined direction, and the first connected components.

2. The image processing apparatus according to claim 1, wherein a first relative positional relation between the projection surface and a projection apparatus when the first pattern image is photographed is coincident with a second relative positional relation between the planar projection surface and the projection apparatus when the second pattern image is photographed.

3. The image processing apparatus according to claim 1, wherein the extraction circuitry includes:
identifying circuitry to identify an adjacent second feature point of each of the coordinate-transformed second feature points in the second photographed image in a predetermined first direction, and an adjacent first feature point of each of the first feature points in the first photographed image in the first direction; and
connected component generation circuitry to generate the second connected components in which the adjacent second feature points in the second photographed image are connected, and the first connected components in which the adjacent first feature points in the first photographed image are connected.

4. The image processing apparatus according to claim 1, further comprising first correction processing circuitry to correct the projection target image on the basis of the first correction information.

5. The image processing apparatus according to claim 4, further comprising:
three-dimensional coordinates calculation circuitry to calculate, using the first pattern image and the first photographed image, three-dimensional coordinates of the first feature points in the first projection image of the first pattern image projected on the projection surface;
approximate plane calculation circuitry to calculate, from the three-dimensional coordinates of the first feature points, an approximate plane approximated to a planar projection target surface;
front image generation circuitry to generate a front image obtained by photographing the first projection image from a direction perpendicular to the approximate plane;

projection area generation circuitry to generate, from the approximate plane and the front image, a projection area on which a projection target image is projected;

second calculation circuitry to calculate second correction information for correcting the projection target image such that the projected projection target image is within the projection area; and second correction circuitry to correct, on the basis of the second correction information, the projection target image corrected on the basis of the first correction information.

6. An image processing system, comprising:
the image processing apparatus according to claim 1;
a projector to project the first pattern image and the second pattern image; and
the camera to take the first photographed image and the second photographed image.

7. An image processing method, comprising:
performing control such that
a first pattern image in which a plurality of first feature points are arranged is caused to be projected on a projection surface, and
a second pattern image including a plurality of second feature points corresponding to the first feature points is caused to be projected on a planar projection surface;
acquiring, from a camera, a first photographed image of the projected first pattern image projected on the projection surface and a second photographed image of the second pattern image projected on the planar projection surface;
extracting second connected components in which the second feature points in the second photographed image are connected in a predetermined direction and first connected components in which the first feature points in the first photographed image at positions corresponding to the second feature points included in the second connected components are connected;
calculating shift amounts of the first connected components with respect to the second connected components;
calculating first correction information for correcting a projection target image on the basis of the shift amounts; and
performing coordinate transformation on second coordinates information of the second feature points on the second photographed image into first coordinates information on the first photographed image,
wherein the extracting extracts the second connected components in which the coordinate-transformed second feature points in the second photographed image are connected in a predetermined direction, and the first connected components.

8. A computer program product comprising a non-transitory computer-readable medium including programmed instructions, the instructions cause a computer to execute:
performing control such that
a first pattern image in which a plurality of first feature points are arranged is caused to be projected on a projection surface, and
a second pattern image including a plurality of second feature points corresponding to the first feature points is caused to be projected on a planar projection surface;
acquiring, from a camera, a first photographed image of the projected first pattern image projected on the projection surface and a second photographed image of the second pattern image projected on the planar projection surface;

extracting second connected components in which the second feature points in the second photographed image are connected in a predetermined direction, and first connected components in which the first feature points in the first photographed image at positions corresponding to the second feature points included in the second connected components are connected;

calculating shift amounts of the first connected components with respect to the second connected components;

calculating first correction information for correcting a projection target image on the basis of the shift amounts; and performing coordinate transformation on second coordinates information of the second feature points on the second photographed image into first coordinates information on the first photographed image, wherein the extracting extracts the second connected components in which the coordinate-transformed second feature points in the second photographed image are connected in a predetermined direction, and the first connected components.

* * * * *